United States Patent
Xiong et al.

(10) Patent No.: US 11,553,529 B2
(45) Date of Patent: Jan. 10, 2023

(54) METHODS AND APPARATUSES FOR DETERMINING AND CONFIGURING A TIME-FREQUENCY RESOURCE, IN THE RANDOM ACCESS PROCESS

(71) Applicant: Samsung Electronics Co., Ltd., Suwon-si (KR)

(72) Inventors: Qi Xiong, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 16/757,903

(22) PCT Filed: Jan. 11, 2019

(86) PCT No.: PCT/KR2019/000458
§ 371 (c)(1),
(2) Date: Apr. 21, 2020

(87) PCT Pub. No.: WO2019/139407
PCT Pub. Date: Jul. 18, 2019

(65) Prior Publication Data
US 2020/0344810 A1   Oct. 29, 2020

(30) Foreign Application Priority Data

Jan. 11, 2018  (CN) .......................... 201810028136.1
Jan. 23, 2018  (CN) .......................... 201810065204.1
(Continued)

(51) Int. Cl.
*H04W 74/08*  (2009.01)
*H04L 1/18*   (2006.01)
*H04W 56/00*  (2009.01)

(52) U.S. Cl.
CPC ....... *H04W 74/0833* (2013.01); *H04L 1/1861* (2013.01); *H04W 56/0015* (2013.01)

(58) Field of Classification Search
CPC .......... H04W 74/0833; H04W 56/0015; H04L 1/1861
See application file for complete search history.

(56) References Cited

U.S. PATENT DOCUMENTS

| 10,218,466 B2 | 2/2019 | Yu et al. |
| 2013/0242730 A1* | 9/2013 | Pelletier ............ H04W 74/0833 370/230 |

(Continued)

FOREIGN PATENT DOCUMENTS

| CN | 102325382 A | 1/2012 |
| EP | 03 157 296 A1 | 4/2017 |

(Continued)

OTHER PUBLICATIONS

Discussions on remaining details on RACH procedure (Year: 2017).*
(Continued)

*Primary Examiner* — Ayanah S George
(74) *Attorney, Agent, or Firm* — Jefferson IP Law, LLP

(57) ABSTRACT

The present application provides a method for determining a random access resource by a terminal in a wireless communication system, the method comprising: receiving, from a base station, configuration information corresponding to a synchronization signal block (SSB) including a SSB index, a random access preamble index and a random access channel mask index; determining a random access resource based on the SSB index and the random access channel mask index; determining a random access preamble based on the random access preamble index; and transmitting, to the base station, the random access preamble on the random access resource.

15 Claims, 9 Drawing Sheets

(30) Foreign Application Priority Data

| Feb. 13, 2018 | (CN) | 201810150263.9 |
| Mar. 27, 2018 | (CN) | 201810260790.5 |
| Jul. 4, 2018 | (CN) | 201810725168.7 |

(56) References Cited

U.S. PATENT DOCUMENTS

| 2013/0343307 | A1 | 12/2013 | Desai et al. | |
| 2016/0057669 | A1 | 2/2016 | Hong et al. | |
| 2019/0110314 | A1* | 4/2019 | Abedini | H04W 74/008 |
| 2020/0008247 | A1* | 1/2020 | Kwak | H04B 7/0695 |

FOREIGN PATENT DOCUMENTS

| GB | 2568662 A | 5/2019 |
| KR | 10-2016-0113672 A | 9/2016 |

OTHER PUBLICATIONS

NTT DOCOMO, Inc., 'Discussion on remaining details on RACH procedure', R1-1718184, 3GPP TSG RAN WG1 Meeting 90bis, Prague, CZ, Oct. 3, 2017.

NTT DOCOMO, Inc., 'Remaining details on RACH procedure', R1-1720795, 3GPP TSG RAN WG1 Meeting #91, Reno, USA, Nov. 18, 2017.

Ericsson, 'SS Block index dependent system information', R2-1712484, 3GPP TSG-RAN WG2 #100, Reno, Nevada, USA, Nov. 16, 2017.

Catt, 'Further details on NR 4-step RA Procedure', R1-1717803, 3GPP TSG RAN WG1 Meeting #90bis, Prague, CZ, Oct. 3, 2017.

Samsung, "Remaining details on PRACH procedure", 3GPP Draft; R1-1720278, F-06921, Nov. 18, 2017, XP051369905.

Qualcomm Incorporated, "Remaining Details on RACH Procedure", R1-1720653, F-06921, Nov. 18, 2017, XP051370115.

Extended European Search Report dated Oct. 1, 2020, issued in European Patent Application No. 19738122.1-1215.

MediaTek Inc., UL BWP ambiguilty during RAR reception, 3GPP TSG-RAN WG2 NR Ad hoc 1801, R2-1801272, Vancouver, Canada, Jan. 22-Jan. 26, 2018.

Chinese Office Action dated Apr. 8, 2022, issued in Chinese Application No. 201810028136.1.

EP Office Action dated Mar. 3, 2022, issued in EP Patent Application No. 19738122.1.

Korean Notice of Allowance dated Jun. 9, 2022, issued in Korean Application No. 10-2020-7019394.

* cited by examiner

[Fig. 1]
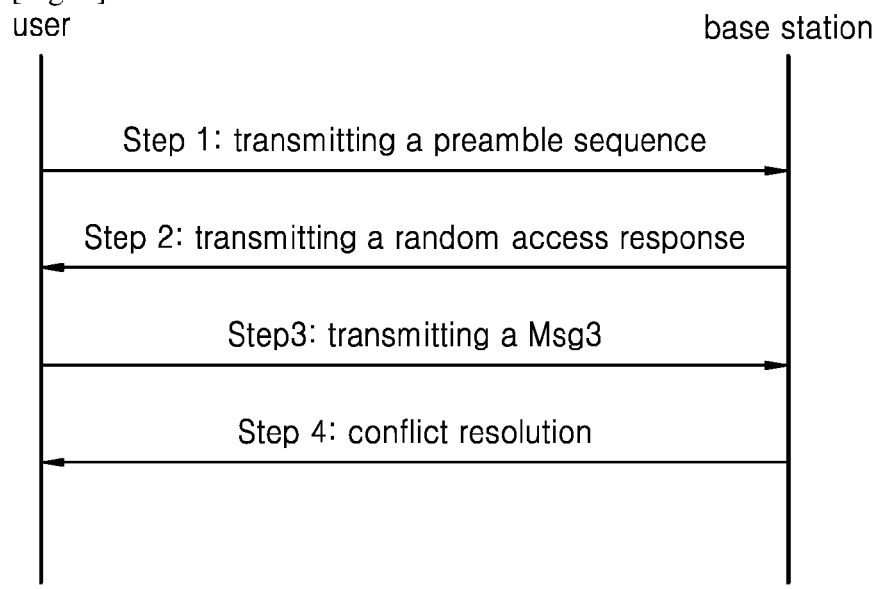
[Fig. 2]
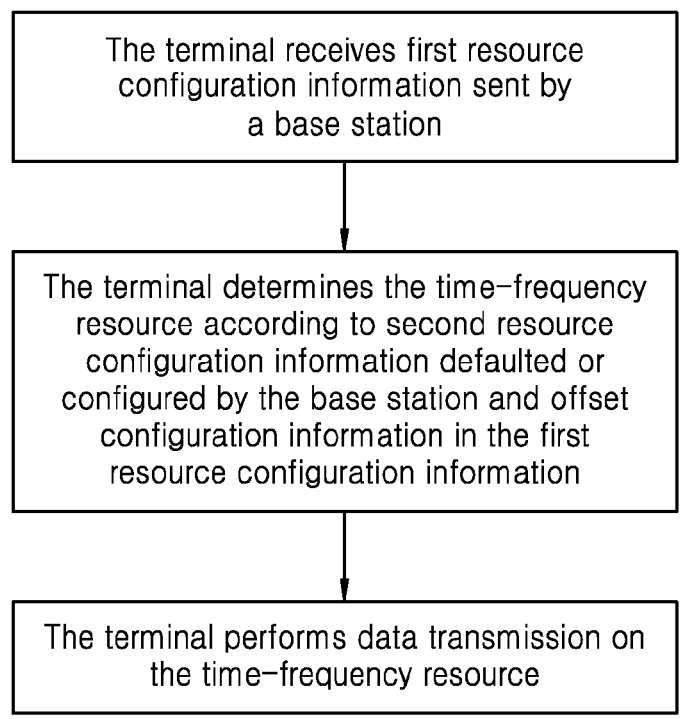

[Fig. 5]
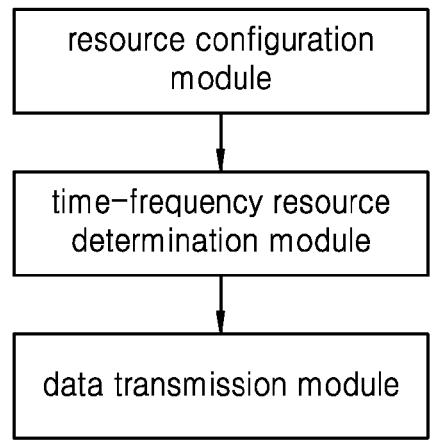
[Fig. 6]
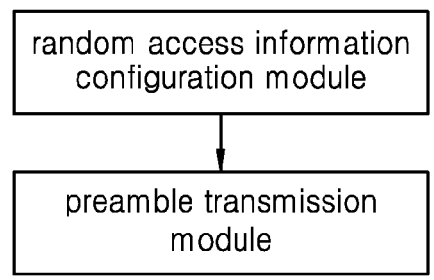

[Fig. 8]
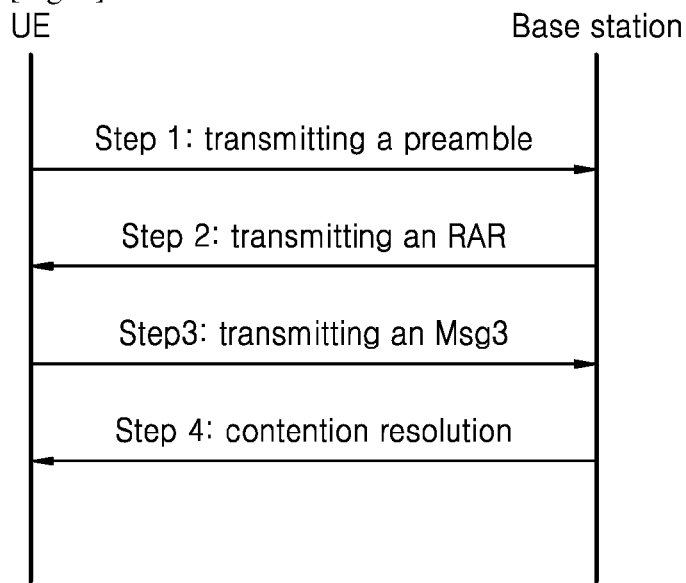
[Fig. 9]
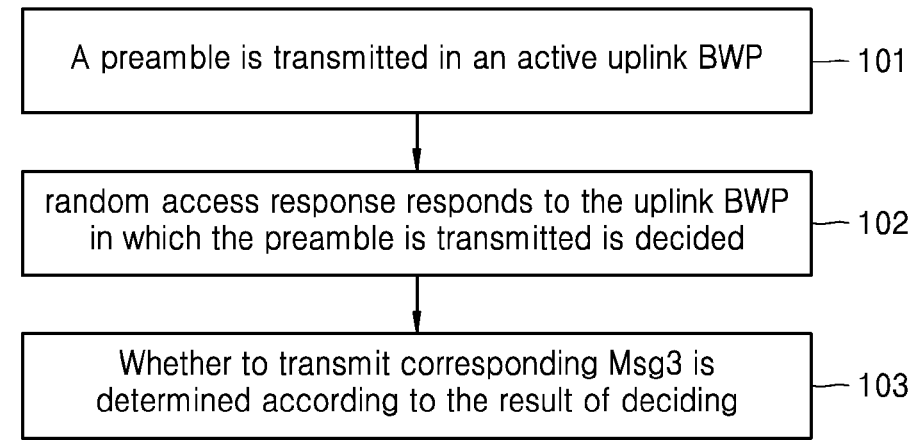

[Fig. 10]
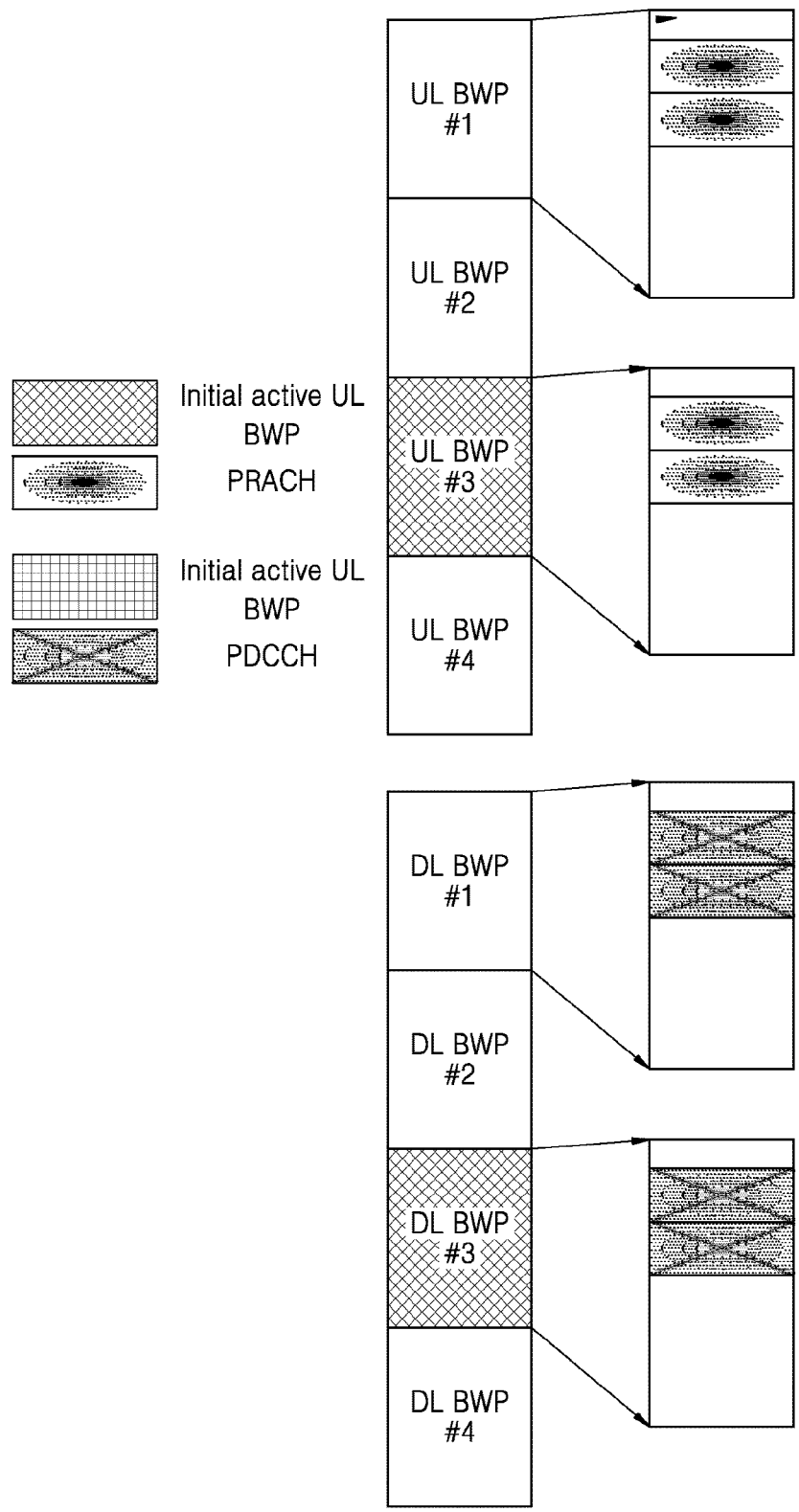

[Fig. 11]
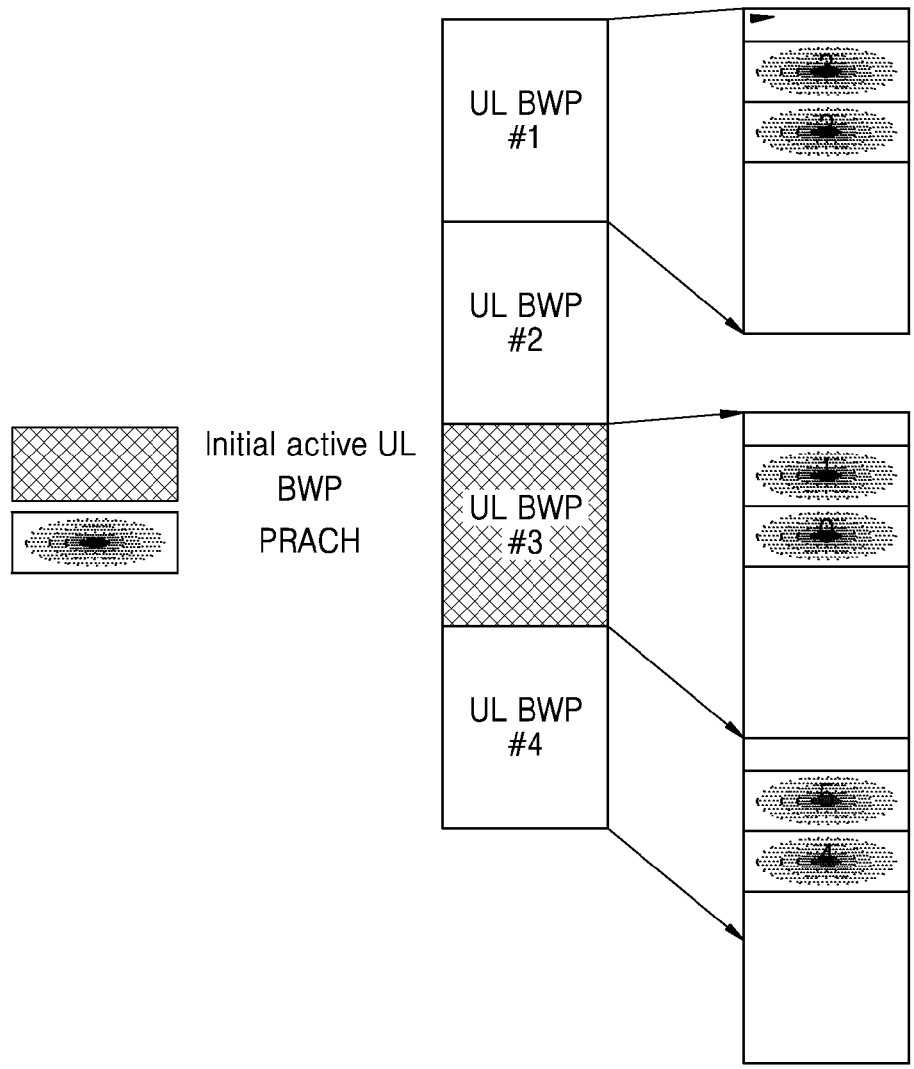
[Fig. 12]
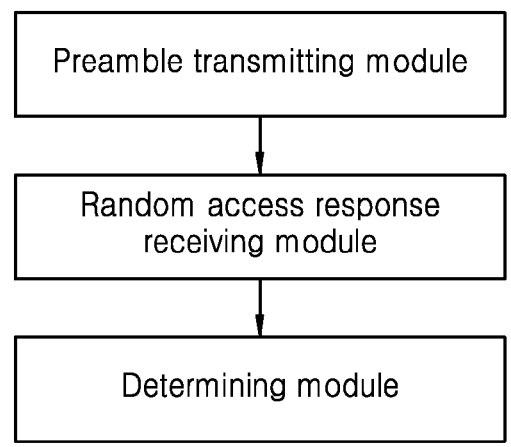

[Fig. 13]
1300
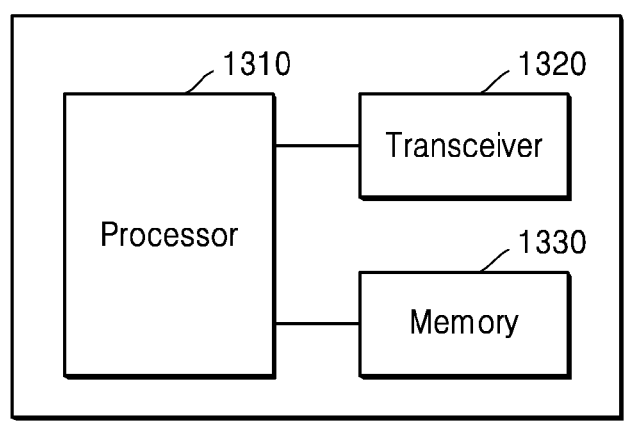
[Fig. 14]
1400
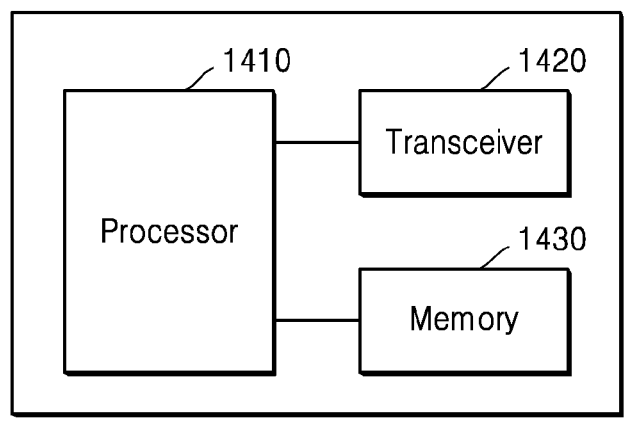

METHODS AND APPARATUSES FOR DETERMINING AND CONFIGURING A TIME-FREQUENCY RESOURCE, IN THE RANDOM ACCESS PROCESS

TECHNICAL FIELD

The present invention relates to the technical field of wireless communication, and more particularly, to methods and apparatuses for determining and configuring a time-frequency resource and a communication method and device in the random access process.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

According to an aspect of an exemplary embodiment, there is provided a method for configuring a random access process and determining a random access resource.

Advantageous Effects of Invention

Aspects of the present disclosure provide an efficient communication methods in a wireless communication system.

BRIEF DESCRIPTION OF DRAWINGS

In order to describe the technical solution in the embodiments of the present invention more clearly, accompanying drawings required to be used in the description of the embodiments will be introduced briefly as follows. It is apparent that the accompanying drawings in the following description are merely some embodiments of the present invention, and it is practicable for those skilled in the art to obtain other accompanying drawings according to these ones under the premise of making no creative efforts.

FIG. 1 is a schematic flow chart of a contention-based random access;

FIG. 2 is a flow chart of a method for determining a time-frequency resource;

FIG. 5 is a device for determining a time-frequency resource provided by the present invention;

FIG. 6 is a device for determining a time-frequency resource of a random access channel provided by the present invention;

FIG. 8 is a schematic diagram of a contention-based random access communication interaction process of the LTE system;

FIG. 9 is a schematic flowchart of a random access method according to the present invention;

FIG. 10 is a schematic diagram of UE uplink BWP and UE downlink BWP configuration according to the present invention;

FIG. 11 is a schematic diagram of frequency domain indexes in the RA-RNTI according to the present invention; and FIG. 12 is a module block diagram of a user equipment for random access method according to the present invention.

FIG. 13 is a block diagram illustrating the structure of a terminal (UE) according to embodiments of the present invention.

FIG. 14 is a block diagram illustrating the structure of a base station according to embodiments of the present invention.

BEST MODE FOR CARRYING OUT THE INVENTION

Figure 3:
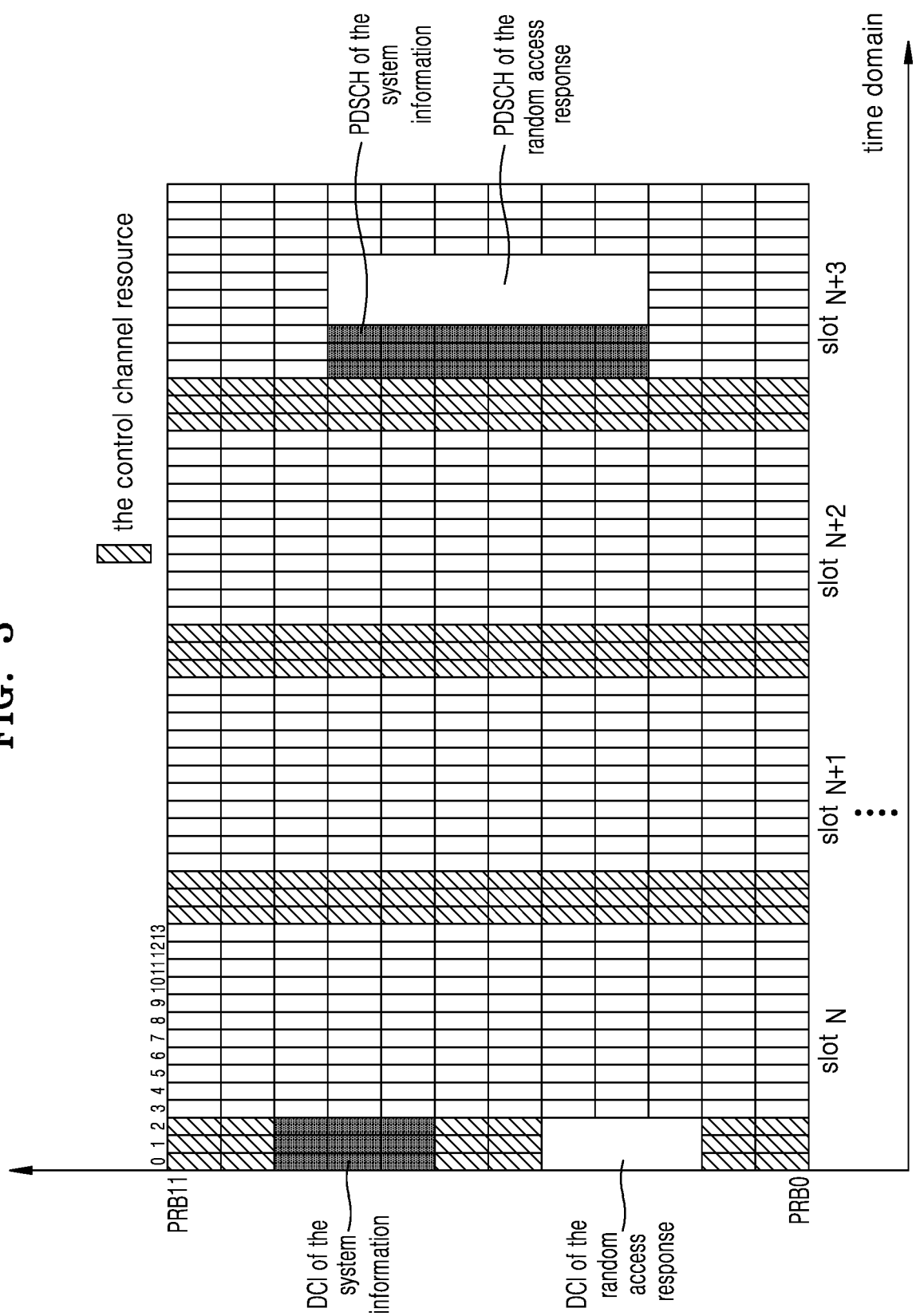
FIG. 3 is a diagram of an example of a method for determining a time domain PDSCH position of a random access response.

An object of the present invention is to provide methods for determining and configuring a time-frequency resource, in order to overcome the defects in prior art.

In order to achieve the above purposes, the present invention provides methods for determining and configuring a time-frequency resource, comprising the following steps: receiving, by a terminal, first resource configuration information sent by a base station; determining, by the terminal, the time-frequency resource according to second resource configuration information defaulted or configured by the base station and offset configuration information in the first resource configuration information; and performing, by the terminal, data transmission on the time-frequency resource.

The second resource configuration information may comprise at least one or more of the following: transmission system information configured through downlink control information or downlink time-frequency resource configuration information of the minimum remaining system information; uplink time-frequency resource configuration information indicated by an uplink grant of a message 3 configured through a random access response; and time-frequency resource configuration information for receiving the random access response configured through the downlink control information.

The first resource configuration information comprises at least one or more of the following: downlink control information configured for receiving a random access response; uplink grant information in the random access response configured for transmitting a message 3 for the first time; downlink control information configured for transmitting the retransmission of the message 3; and downlink control information configured for receiving a contention resolution message.

The determining the time-frequency resource according to the second resource configuration information defaulted or configured by the base station and the offset configuration information in the first resource configuration information may comprise: determining, by the terminal, a time domain resource according to time domain resource configuration information in the second resource configuration information and time domain offset configuration information in the offset configuration information; and determining, by the terminal, a frequency domain resource according to frequency domain resource configuration information in the second resource allocation information and frequency domain offset configuration information in the offset configuration information.

The determining the time domain resource may comprise the following steps: determining a slot index of the resource according to a slot offset in the second resource configuration information and a slot offset in the offset configuration information; determining a starting symbol index of the resource according to a starting symbol index in the second resource configuration information and an offset of a starting symbol in the offset configuration information; determining the number of consecutive symbols of the resource according to the number of consecutive symbols in the second resource configuration information and an offset of the number of consecutive symbols in the offset configuration information; and determining the time domain resource of the time-frequency resource according to the slot value, the starting symbol index, and the number of the consecutive symbols, wherein at least one of the slot value, the starting symbol index, and the number of the consecutive symbols is information in the second resource configuration information, and/or at least one of the slot value, the starting symbol index, and the number of the consecutive symbols is pre-configured.

The determining the frequency domain resource may comprise the following steps: determining a starting physical resource block index of the resource according to a starting physical resource block index in the second resource configuration information and offset information of a starting physical resource block index in the offset configuration information; determining the number of consecutive physical resource blocks of the resource according to the number of consecutive physical resource blocks in the second resource configuration information and an offset of consecutive physical resource blocks in the offset configuration information; and determining the frequency domain resource of the time-frequency resource according to the starting physical resource block index and the number of the consecutive physical resource blocks, wherein at least one of the starting physical resource block index and the number of the consecutive physical resource blocks is information in the second resource configuration information, and/or at least one of the starting physical resource block index and the number of the consecutive physical resource blocks is pre-configured.

The time domain offset configuration information may comprise at least one of the following: an offset of the starting symbol index, an offset of the slot index, and an offset of the number of the consecutive symbols; and the frequency domain offset configuration information comprises at least one of the following: an offset of the starting physical resource block index, and an offset of the consecutive physical resource blocks.

The time domain offset configuration information may be notified by one of the following manners: an index indicating a preset offset configuration combination; and index combinations indicating different offsets, respectively, The offset configuration combination may comprise at least one of the offset of the starting symbol index, the offset of the slot index, and the offset of the number of the consecutive symbols; the index combinations indicating different offsets comprise indexes of at least one of the offset of the starting symbol index, the offset of the slot index, and the offset of the number of the consecutive symbols.

The time domain offset configuration information may be notified by one of the following manners: an index indicating a preset offset configuration combination; and index combinations indicating different offsets, respectively, The offset configuration combination may comprises at least one of the offset of the starting physical resource block index, and the offset of the consecutive physical resource blocks; the index combinations indicating different offsets comprise indexes of at least one of the offset of the starting physical resource block index, and the offset of the consecutive physical resource blocks.

The present invention further provides a method for determining a time-frequency resource of a random access channel, comprising the following steps: determining, by the terminal, the time-frequency resource of the random access channel and a preamble sequence according to downlink control information; and transmitting, by the terminal, the preamble sequence on the time-frequency resource of the random access channel.

The downlink control information may comprise at least one or more of the following information: the number of downlink transmission beam index; and random access configuration information for each downlink beam index.

The random access configuration information for each downlink beam index may comprise at least one or more of the following information: the downlink transmission beam index; a random access preamble index; and a random access preamble time-frequency resource index.

The present invention also provides a method for determining a random access resource of a target cell, including the following steps: receiving, by a terminal, configuration information of the target cell; determining, according to the configuration information, a mapping pattern period from SSB to RO of the target cell, wherein when the determined mapping pattern period is not equal to or greater than the preset time length, that is X milliseconds, the terminal determines that the absolute time offset between the i-th radio frame of the current cell and the i-th radio frame of the target cell is not greater than Y; and determining the random access resource of the target cell.

X may be 10, and/or Y may be 5 milliseconds;

The determining the random access resource of the target cell includes: determining, by the terminal, the radio frame number of the target cell according to the radio frame number of the current cell, and determining the mapping from SSB to RO, and the positions of SSB and RO according to the configuration information and the radio frame number of the target cell.

The present invention also provides an apparatus for determining a random access resource of a target cell, including: a configuration information receiving module, configured to receive configuration information of the target cell by a terminal; a mapping pattern period determining module, configured to determine, by the terminal, a mapping pattern period from SSB to RO of the target cell according to the configuration information; a radio frame determining module of the target cell, configured, when the determined mapping pattern period is not equal to or greater than the preset time length, that is X milliseconds, for the terminal to determine that the absolute time offset between the i-th radio frame of the current cell and the i-th radio frame of the target cell is not greater than Y, that is, for the terminal to determine the radio frame number of the target cell; a random access resource determining module of the target cell, configured for the terminal to determine the mapping from SSB to RO, and the positions of SSB and RO according to the configuration information and the radio frame number of the target cell.

The present invention also provides a method for determining whether a random access contention resolution is successful, including: transmitting, by a terminal, a random access message 3 which includes the C-RNTI allocated by a base station; searching for, by the terminal, possible downlink control channels; and determining, by the terminal, whether the random access contention resolution is successful when the terminal detects the downlink control channel, and the detected downlink control channel meets the following conditions: the downlink control channel is marked by the C-RNTI, the detected downlink control channel includes an uplink grant for a new transmission, and the detected downlink control channel carries indication information for indicating that the uplink grant is for a random access contention resolution message.

The indication information for indicating that the uplink grant may be for a random access contention resolution message is: an HARQ process index of which the value is a preset value.

The preset value may be 1.

The present invention also provides an apparatus for determining whether a random access contention resolution is successful, including: a random access message 3 transmitting module, configured to transmit a random access message 3; a downlink control channel search module, configured to search for and detect a possible downlink control channel; a random access competition resolution determining module, configured to: determine whether the random access contention resolution is successful according to whether the detected downlink control channel is marked by the C-RNTI, whether the detected downlink control channel includes an uplink grant for a new transmission, and whether the detected downlink control channel carries indication information for indicating that the uplink grant is for a random access contention resolution message.

The present invention further provides a device for determining a time-frequency resource, comprising the following modules: a resource configuration reception module, configured to receive first configuration information sent by a base station; a time-frequency resource determination module, configured to determine a time-frequency resource according to second configuration information defaulted or configured by the base station and offset configuration information in the first configuration information; and a data transmission module, configured to perform data transmission on the time-frequency resource.

The present invention further provides a device for determining a time-frequency resource of a random access channel, comprising the following modules: a random access information configuration module, used for a terminal to configure the time-frequency resource of the random access channel and a random access preamble according to downlink control information; a preamble transmission module, used for a terminal to transmit the preamble on the time-frequency resource of the random access channel.

Another object of the present invention is to overcome the deficiencies of the prior art and provide a communication method and device in the random access process with ideal random access success rate and efficiency.

In order to achieve the above purpose, the present invention provides a random access process communication method, comprising the following steps of: transmitting a preamble in an active uplink Band Width Part (BWP); receiving a random access response, and deciding whether the random access response corresponds to the uplink BWP in which the preamble is transmitted; and determining whether to transmit a corresponding message 3 according to the result of deciding.

The transmitting a preamble in an active uplink BWP, may comprise:
transmitting the preamble in an initial active uplink BWP and current active uplink BWP;
the receiving a random access response comprises:
receiving the random access response in the initial active downlink BWP.

The transmitting a preamble in an active uplink BWP, may comprise:
transmitting the preamble in the current active uplink BWP;

the receiving a random access response comprises:

receiving the random access response in the current active downlink BWP.

The transmitting a preamble in an active uplink BWP, may comprise:

transmitting the preamble in the current active uplink BWP;

the receiving a random access response comprises:

receiving the random access response in the current active downlink BWP and the initial active downlink BWP.

The deciding whether the random access response corresponds to the uplink BWP in which the preamble is transmitted, may comprise:

deciding whether the random access response corresponds to the uplink BWP in which the preamble is transmitted, by scheduling Downlink Control Information (DCI) of the random access response.

The deciding whether the random access response corresponds to the uplink BWP in which the preamble is transmitted, may comprise:

deciding whether the random access response corresponds to the uplink BWP in which the preamble is transmitted, by scheduling BWP indication information provided in DCI of the random access response or by scheduling BWP indication information provided in the random access response.

The deciding whether the random access response corresponds to the uplink BWP in which the preamble is transmitted, may comprise:

deciding whether the random access response corresponds to the uplink BWP in which the preamble is transmitted, by a correspondence between a Random Access-Radio Network Temporary Identifier frequency domain index and an uplink BWP index used by scheduling the DCI of the random access response.

The correspondence between a RA-RNTI frequency domain index and an uplink BWP index may comprise relations of different the uplink BWP indexes corresponding to different the RA-RNTI frequency domain indexes.

The correspondence between a RA-RNTI frequency domain index and an uplink BWP index may comprise:

A correspondence between the RA-RNTI frequency domain indexes and the uplink BWP indexes formed by sorting all uplink BWPs in a carrier range in ascending order or descending order of BWP indexes to form a queue, performing cyclic traversal on the queue in either direction in the initial active uplink BWP, and mapping the RNTI frequency domain indexes into the queue in ascending order.

The step of determining whether to transmit a corresponding message 3 according to the result of deciding may comprise: the corresponding message 3 is not transmitted and the random access response is continued to be searched in a random access response search window, if the random access response does not correspond to the uplink BWP in which the preamble is transmitted; the corresponding message 3 is transmitted, if the random access response corresponds to the uplink BWP in which the preamble is transmitted and a preamble identifier in the random access response matches the transmitted preamble.

In order to achieve the above purpose, the present invention also provides an user equipment, comprising: Ea preamble transmitting module, configured to transmit a preamble in an active uplink Band Width Part (BWP); a random access response receiving module, configured to receive the random access response and decide whether the random access response corresponds to the uplink BWP in which the preamble is transmitted; and a determining module, configured to determine whether to transmit a corresponding message 3 according to the result of deciding.

In order to achieve the above purpose, the present invention also provides an user equipment, comprising: a processer; and a memory, configured to store the computer readable instructions that, when executed by the processor, enable the processor to perform the aforementioned random access process communication method.

In accordance with an aspect of the present invention, a method for determining a random access resource by a terminal in a wireless communication system is provided, The method comprises: receiving, from a base station, configuration information corresponding to a synchronization signal block (SSB) including a SSB index, a random access preamble index and a random access channel mask index; determining a random access resource based on the SSB index and the random access channel mask index; determining a random access preamble based on the random access preamble index; and transmitting, to the base station, the random access preamble on the random access resource.

The determining of the random access resource may further comprise determining a random access channel occasion (RO), based on the random access channel mask index.

At least one RO may correspond to a SSB.

A RO index may be ordered in a manner of frequency domain first.

The determining of the RO further may comprise determining the RO in a first available complete SSB-to-RO mapping from among one or more complete SSB-to-RO mapping corresponding to a RO index.

In accordance with an aspect of the present invention, a method for determining a random access resource by a base station in a wireless communication system is provided. The method comprises: transmitting, to a terminal, configuration information corresponding to a synchronization signal block (SSB) including a SSB index, a random access preamble index and a random access channel mask; receiving, from the terminal, a random access preamble determined based on the random access preamble index on a random access channel resource determined based on the SSB index and the random access channel mask index; and transmitting, to the terminal, a random access response (RAR) based on the random access preamble.

The random access channel mask index may indicate a random access channel occasion (RO).

At least one RO may correspond to a SSB.

A RO index may be ordered in a manner of frequency domain first.

In accordance with an aspect of the present invention, a terminal for determining a random access resource is provided. The terminal comprises: a transceiver; and at least one controller coupled with the transceiver and configured to: receive, from a base station, configuration information corresponding to a synchronization signal block (SSB) including a SSB index, a random access preamble index and a random access channel mask index; determine a random access resource based on the SSB index and the random access channel mask index; determine a random access preamble based on the random access preamble index; and transmit, to the base station, the random access preamble on the random access resource.

The controller may be further configured to: determine a random access channel occasion (RO), based on the random access channel mask index.

A RO index may be ordered in a manner of frequency domain first.

In accordance with an aspect of the present invention, a base station for determining a random access resource is provided. The base station comprises a transceiver; and at least one controller coupled with the transceiver and configured to: transmit, to a terminal, configuration information corresponding to a synchronization signal block (SSB) including a SSB index, a random access preamble index and a random access channel mask; receive, from the terminal, a random access preamble determined based on the random access preamble index on a random access channel resource determined based on the SSB index and the random access channel mask index; and transmit, to the terminal, a random access response (RAR) based on the random access preamble.

The random access channel mask index may indicate a random access channel occasion (RO).

A RO index may be ordered in a manner of frequency domain first.

Compared with the priori art, technical effects of the present invention include but not limit to: resolves the contention in the UE random access and significantly improves the success rate and the efficiency of the random access, by the correspondence between the uplink BWP in which the preamble is transmitted and the random access response.

MODE FOR THE INVENTION

In order to make those skilled in the art better understand the solutions of the specific implementation, the technical solutions in the embodiments of the specific implementation will be described clearly and completely in the following taken in conjunction with the accompany drawings in the embodiments of the specific implementation.

In some procedures described in the specification, claims and the above-mentioned drawings of the specific implementation, a plurality of operations appearing in a specific order are included, but it should be clearly understood that these operations may not be performed in the order in which they appeared herein or performed in parallel. The number of operations, such as 101, 102 and the like, are merely used to distinguish different operations from each other, and the number itself does not represent any execution order. In addition, these procedures may include more or fewer operations, and these operations may be performed in order or in parallel. It should be noted that the descriptions of "first", "second" and the like herein are used to distinguish different messages, apparatuses, modules, etc., do not represent the sequential order, and not define that "first" and "second" are different types as well.

The technical solutions in the embodiments of the specific implementation will be described clearly and completely in the following taken in conjunction with the accompany drawings in the embodiments of the specific implementation. Obviously, the described embodiments are merely a part of the embodiments of the specific implementation, rather than all embodiments. All other embodiments obtained by those skilled in the art under the premise of making no creative efforts based on the embodiments in specific implementation belong to the protection scope of the specific implementation.

The embodiments of the present disclosure are described in detail below, and examples of the embodiments are illustrated in the accompanying drawings, wherein the same or similar reference numerals denote the same or similar elements or elements having the same or similar functions from beginning to end. The embodiments described below with reference to the accompanying drawings are exemplary only to explain the present disclosure, and should not be construed as limiting the present disclosure.

It should be understood by those skilled in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

It should be understood by those skilled in the art that unless otherwise defined, all terms (including technical and scientific terms) used herein have the same meaning as commonly understood by those skilled in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly defined herein.

It should be understood by a person of ordinary skill in the art that term "terminal" and "user equipment" as used herein include not only wireless signal receiver apparatuses having no emission capability but also receiving and emitting hardware apparatuses with capable of carrying out bidirectional communication over a bidirectional communication link. Such apparatuses can include cellular or other communication apparatuses with a single-line display or multi-line display or without a multiline display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (aviation, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

With the rapid development of the information industry, especially the growth demands from the mobile internet and internet of things (IoT), it brings unprecedented challenges to future mobile communication technology. As according to the report ITU-R M. [IMT.BEYOND 2020. TRAFFIC] of the International Telecommunication Union (ITU), it may be expected that, by 2020, the growth of mobile traffic will increase by nearly 1,000 times compared to 2010 (4G era), and the number of user equipment connections will also exceed 17 billion, and as the vast number of IoT apparatuses gradually infiltrate the mobile communication network, the number of connected apparatuses will be more surprising. In order to cope with the unprecedented challenges, the communication industry and academia have conducted extensive researches on fifth-generation mobile communication technology for the 2020's. Currently, the framework and overall goals of future 5G have been discussed in the report ITU-R M. [IMT.VISION] of ITU, in which the demand outlook, application scenarios, and various important performance indices for 5G have been described in detail. For new demands in 5G, the report ITU-R M.[IMT.FUTURE TECHNOLOGY TRENDS] of ITU provides information related to technology trends for 5G, aims to solve significant problems of significant increase in system throughput, consistency and extensibility of user experience to support IoT, latency, energy efficiency, cost, network flexibility, support for emerging services, and flexible spectrum utilization, etc.

The transmission in the wireless communication system includes: transmission from a base station (gNB) to a user equipment (UE, User Equipment) (referred to as downlink transmission), with the corresponding slot being referred to as a downlink slot; and transmission from the UE to the base station (referred to as uplink transmission), with the corresponding slot being referred to as an uplink slot.

In the downlink communication of the wireless communication system, the system periodically transmits synchronization signals and broadcast channels to the user through a synchronization signal block (SSB, synchronization signal/PBCH block), which is a synchronization signal block period (SSB periodicity), or is referred to as SSB burst periodicity. At the same time, the base station configures a physical random access configuration period (PRACH configuration period), within which a certain number of PRACH transmission occasions (ROs) are configured, and it is satisfied that all SSBs may be mapped to the corresponding ROs within a mapping period or an association period (a certain time length).

In the New Radio (NR) communication system, before radio resource control is established, such as during a random access procedure, the performance of random access directly affects the user's experience. In traditional wireless communication systems, such as LTE and LTE-Advanced, the random access procedure is applied to multiple scenarios such as establishing an initial link, cell handover, re-establishing an uplink, RRC connection re-establishment, and so on, and is divided into Contention-based Random Access and Contention-free Random Access based on whether the user monopolizes preamble sequence resources. Due to the contention-based random access, each user selects a preamble sequence from the same preamble sequence resource during the process of attempting to establish the uplink, which may occur that multiple users may select the same preamble sequence to transmit to the base station. Therefore, the contention resolution mechanism is an important research direction in random access. How to reduce the probability of conflicts and how to quickly resolve the conflicts that have already occurred are the key indices that affect the performance of random access.

The contention-based random access procedure in LTE-A is divided into four steps, as shown in FIG. 1. In the first step, the user randomly selects a preamble sequence from the preamble sequence resource pool and transmits it to the base station. The base station performs correlation detection on the received signal to identify the preamble sequence sent by the user. In the second step, the base station transmits the user a Random Access Response (RAR), including a random access preamble sequence identifier, a timing advance instruction determined according to the delay estimation between the user and the base station, a Cell-Radio Network Temporary Identifier (C-RNTI), and time-frequency resources allocated for the next uplink transmission of the user. In the third step, the user transmits a message 3 (Msg3) to the base station according to the information in the RAR. The Msg3 includes information such as a user terminal identity and an RRC link request, etc., wherein the user terminal identity is unique to the user and used to resolve the conflict. In the fourth step, the base station transmits the user a contention resolution identity including the user terminal identity of a user who won the conflict resolution. After detecting its own identity, the user upgrades the temporary C-RNTI to a C-RNTI, transmits an ACK signal to the base station to complete the random access procedure, and waits for the scheduling by the base station. Otherwise, the user will start a new random access procedure after a certain delay.

For the contention-free random access procedure, since the base station have known the user identity, the preamble sequence may be allocated to the user. Therefore, when transmitting the preamble sequence, the user does not need to randomly select the sequence, but uses the allocated preamble sequence. After detecting the allocated preamble sequence, the base station will transmit a corresponding random access response, including information such as timing advance and uplink resource allocation, etc. After receiving the random access response, the user considers that the uplink synchronization has been completed and waits for further scheduling by the base station. Therefore, the contention-free random access procedure includes only two steps: Step 1 is to transmit a preamble sequence; and Step 2 is to transmit a random access response.

The random access procedure in LTE is applicable to the following scenarios:
  1. The initial access under RRC IDLE;
  2. Re-establishing the RRC connection;
  3. Cell handover;
  4. The arrival of downlink data and requesting for a random access procedure in the RRC connected state (when the uplink is in non-synchronization);
  5. The arrival of uplink data and requesting for the random access procedure in the RRC connected state (when the uplink is in non-synchronization or resources are not allocated for the scheduling request in the PUCCH resources); and
  6. Positioning.

In LTE, same random access steps are used in the above six scenarios. In designing a new system, when the base station transmits a downlink or uplink scheduling grant to the UE, the UE obtains the downlink control information for scheduling the random access response through the current control channel, and the obtained downlink control information includes configuration information for time-frequency positions for the scheduled downlink or downlink resources which is indicated based on that all possible time-frequency position configurations configured by the system have been acquired by the UE. However, for the initially-accessed user, all possible time-frequency position configurations configured by the system have not been acquired, so a default configuration is needed for at least the transmission of system information. However, when the user wants to receive random access response or contention resolution messages for the random access, it may occur that the random access response message or the contention resolution message conflicts with the system message due to the limitation of the size of resources in frequency domain.

Therefore, the problem of how to configure and determine the response message in the random access, etc., is needed to be solved.

In a traditional wireless communication system such as LTE and LTE-Advanced, a random access process is applied to multiple scenarios such as establishment of an initial link, cell handover, re-establishment of an uplink, and re-establishment of Radio Resource Control (RRC) connection. The contention-based random access process is divided into four steps, as shown in FIG. 8. In the first step, the user equipment (UE) randomly selects a preamble from the preamble resource pool and transmits it to the base station. The base station performs correlation detection on the received signal to identify the preamble transmitted by the UE. In the second step, the base station transmits a Random Access Response (RAR) to the UE, which includes a random access preamble identifier, a timing advancement instruction determined according to a delay estimation between the UE and the base station, and a Cell-Radio Network Temporary Identifier (C-RNTI), and the time-frequency resource allocated for the UE's next uplink transmission. In the third step, the UE transmits a Msg3 (a third message, or message 3) to the base station according to the information in the RAR. The Msg3 includes information such as a user terminal identifier and an RRC link request. The user terminal identifier is unique to the UE and is used to resolve the contention. In the fourth step, the base station transmits a contention resolution identifier to the UE, which includes the user terminal identifier of the winning UE in the contention resolution. The UE upgrades the temporary C-RNTI to the C-RNTI after detecting its own identifier, and transmits an ACK signal to the base station to complete the random access process, and waits for the scheduling of the base station. Otherwise, the UE will initiate a new random access process after a delay.

In a new communication system, a UE may have multiple Uplink Band Width Parts (U BWPs) and/or multiple Downlink Band Width Parts (D BWPs) on one carrier. The UE initiates a competitive random access on the BWP having the random access resources, but since there is a case where two UEs select the same preamble to be transmitted on different BWPs and the base station cannot distinguish between two UEs, a contention is caused during the Msg3 is transmitted by the two UEs, and further the success rate and efficiency of random access is affected.

In view of this, it is necessary to provide a random access process communication method and device capable of solving the above technical problems.

FIG. 2 is a flow chart of a method for determining a time-frequency resource, including: a terminal receives first resource configuration information sent by a base station; the terminal determines the time-frequency resource according to second resource configuration information defaulted or configured by the base station and offset configuration information in the first resource configuration information; and the terminal performs data transmission on the time-frequency resource.

In the present invention:

A time domain unit refers to an OFDM symbol, a combination of multiple OFDM symbols, half of a slot, a slot, a combination of multiple slots, a subframe, a combination of multiple subframes, a system frame, a combination of multiple system frames, or predefined absolute time, such as X milliseconds, etc.

A frequency domain unit refers to a subcarrier, a combination of multiple subcarriers, half of a physical resource block (PRB), a PRB, a combination of multiple PRBs, or a predefined width of absolute frequency domain, such as X Hz, etc.

In other parts of the present invention, the OFDM symbol and the slot are taken as examples of the time domain unit; the PRB is taken as an example of the frequency domain unit.

In the present invention, the number of consecutive OFDM symbols has the same meaning as the number of occupied OFDM symbols or the number of OFDM symbols occupied.

In the present invention, the number of consecutive PRBs has the same meaning as the number of occupied PRBs or the number of PRBs occupied.

Embodiment 1

Hereinafter, determining a PDSCH time-frequency resource of a random access response is taken as an example to illustrate that the present invention provides methods for determining and configuring a time-frequency resource.

When a UE initially accesses the network, it obtains the time-frequency resource position of PDSCH carrying the system message through the read scheduling information of the downlink control channel, wherein in one case, the DCI indicates the starting position of the frequency domain and the number of frequency domain units occupied by the frequency domain of PDSCH of the system information. According to the default time domain configuration or the time domain configuration selection indicated in the DCI, the UE can accurately obtain the time-frequency resource position of the PDSCH carrying the system message, that is, the UE can determine consecutive OFDM symbols of T_SI_symbol_duration starting from the T_SI_symbol_start OFDM symbol in the time domain with respect to the slot of K0_SI after the time of receiving the DCI. For example, the DCI indicates that the starting position of the frequency domain of PDSCH of the system information starts from the third PRB, namely, F_SI_PRB_start=3, and consecutively occupies six PRBs, namely, F_SI_PRB_duration=6. Meanwhile, if the DCI is received in the Nth slot in the time domain, according to the default time domain configuration, UE can find that the PDSCH carrying the system message scheduled by the DCI is the (N+3)th slot (i.e., K0_SI=3) in the time domain, and the third OFDM symbol is three consecutive OFDM symbols (i.e., T_SI_symbol_duration=3) of the starting OFDM symbol (i.e., T_SI_symbol_start=3).

The UE reads the system information, obtains the random access resource configurations, starts the random access procedure, and after transmitting the random access preamble, the UE searches for possible DCI of a random access response therein according to the configured random access response (RAR) window.

In the DCI of the random access response, the UE may read the time domain PDSCH resource configuration, and/or the frequency domain PDSCH resource configuration.

For the time domain RAR PDSCH resource configured as X bits, there may be that:

1. A time domain offset configuration in a preset configuration table is indicated by X bits. For example, when X=2, the time domain PDSCH resource configuration represents the index values (0, 1, 2, 3) of the time domain offset configuration table, wherein the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_RAR_symbol_duration=T_SI_symbol_duration; all of the three offsets are included as shown in the example of the following table. For example, when the value of the time domain PDSCH resource configuration is 1, it represents that a time domain offset configuration with a configuration index value of 1 is used, the UE may obtain K0_RAR=K0_SI+0=3, T_RAR_symbol_start=T_SI_symbol_start+3=6, T_RAR_symbol_duration=T_SI_symbol_duration+1=4. That is, the PDSCH corresponding to the RAR is four consecutive OFDM symbols starting from the sixth OFDM symbol in the slot of (N+3), as shown in FIG. 3.

TABLE 1 a 1st exemplary table of the time domain offset configuration (X = 2)

| configuration index value | slot offset | offset of the starting OFDM symbol | offset of the number of occupied OFDM symbols |
| --- | --- | --- | --- |
| 0 | −1 | −3 | −1 |
| 1 | 0 | 3 | 1 |
| 2 | 1 | 0 | 0 |
| 3 | 2 | 6 | 2 |

Specifically, the offset of the starting OFDM symbol may represent the multiple of T_SI_symbol_duration, as shown in Table 2. At this time, when the value of the time domain PDSCH resource configuration is 1, the calculation for the starting OFDM symbol is changed to: T_RAR_symbol_start=T_SI_symbol_start+1*T_SI_symbol_duration=3+3=6.

TABLE 2 a 2nd exemplary table of the time domain offset configuration (X = 2)

| configuration index value | slot offset | offset of the starting OFDM symbol | offset of the number of occupied OFDM symbols |
| --- | --- | --- | --- |
| 0 | −1 | −1 | −1 |
| 1 | 0 | 1 | 1 |
| 2 | 1 | 0 | 0 |
| 3 | 2 | 2 | 2 |

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

TABLE 3

Example 1 of the slot offset configuration (2 bits of high-order)

| configuration index value | slot offset |
| --- | --- |
| 0 | −1 |
| 1 | 0 |
| 2 | 1 |
| 3 | 2 |

In particular, for a bit indicating the offset of the starting OFDM symbol, it may:

indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol;

also indicate the multiple of the offset of the starting OFDM symbol based on T_SI_symbol_duration; for example, 2 bits indicate four possible configuration values of [0, 1, 2, 3], and T_SI_symbol_duration=3, which represents 0*3=0 offset of the starting OFDM symbol, 1*3=3 offsets of the starting OFDM symbol, 2*3=6 offsets of the starting OFDM symbol, and 3*3=9 offsets of the starting OFDM symbol;

3. Possible combinations of predefined time domain configurations are indicated by X bits directly. For example, X=2 bits indicate four possible combinations of the time domain configurations, as shown in Table 4. If the value of the time domain PDSCH resource configuration is 1, it represents: K0_RAR=1, T_RAR_symbol_start=6, and T_RAR_symbol_duration=2, which illustrates that the PDSCH of the random access response is two consecutive OFDM symbols starting from the sixth OFDM symbol on the slot (N+1).

TABLE 4 a 1st exemplary table of the time domain configuration (X = 2)

| configuration index value | slot value | the starting OFDM symbol | the number of occupied OFDM symbols |
| --- | --- | --- | --- |
| 0 | 0 | 3 | 2 |
| 1 | 1 | 6 | 2 |
| 2 | 2 | 9 | 1 |
| 3 | 3 | 12 | 1 |

For the frequency domain RAR PDSCH resource configured as Y bits, there may be that:

1. A frequency domain offset configuration in a preset configuration table is indicated by Y bits. For example, when Y=2, the frequency domain PDSCH resource configuration represents the index values (0, 1, 2, 3) of the frequency domain offset configuration table, wherein the frequency offset configuration table may include at least one or more of an offset of the starting PRB and an offset of the number of occupied PRB. When any one of the above two items is not included in the frequency domain offset configuration table, it indicates that the value of the item is 0, that is, the item does not have an offset. For example, the frequency domain offset configuration table does not include the offset of the number of occupied PRBs, it indicates that the offset of the number of occupied PRBs is 0, that is, there is no offset, F_RAR_PRB_duration=F_SI_PRB_duration; all of the two offsets are included as shown in the example of Table 5. For example, when the value of the frequency domain PDSCH resource configuration is 1, it represents that a frequency domain offset configuration with a configuration index value of 1 is used, the UE may obtain F_RAR_PRB_start=F_SI_PRB_start+3=6, F_RAR_PRB_duration=F_SI_PRB_duration−3=3. That is, the PDSCH corresponding to the RAR is three consecutive PRBs starting from the sixth PRB.

TABLE 5 a 1st exemplary table of the frequency domain offset configuration (Y = 2)

| configuration index value | offset of the starting PRB | offset of the number of occupied PRBs |
|---|---|---|
| 0 | −3 | −1 |
| 1 | 3 | −3 |
| 2 | 0 | 0 |
| 3 | 6 | 2 |

In particular, the offset of the starting PRB may represent the multiple of F_SI_PRB_duration, as shown in Table 6. At this time, when the value of the frequency domain PDSCH resource configuration is 1, the calculation for the starting PRB is changed to: F_RAR_PRB_start=F_SI_PRB_start+ 1*F_SI_PRB_duration=3+1*3=6.

TABLE 6 a 2nd exemplary table of the frequency domain offset configuration (Y = 2)

| configuration index value | offset of the starting PRB | offset of the number of occupied PRBs |
|---|---|---|
| 0 | −1 | −1 |
| 1 | 1 | 1 |
| 2 | 0 | 0 |
| 3 | 2 | 2 |

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

TABLE 7

Example 1 of the slot offset configuration (2 bits of high-order)

| configuration index value | offset of the number of occupied PRBs |
|---|---|
| 0 | −1 |
| 1 | 0 |
| 2 | 1 |
| 3 | 2 |

In particular, for a bit indicating the offset of the starting PRB, it may:

indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_SI_PRB_duration; for example, 2 bits indicate four possible configuration values of [0, 1, 2, 3], and F_SI_PRB_duration=3, which represents that the offset of the starting PRB includes 0*3=0 offset of PRBs, 1*3=3 offsets of PRBs, 2*3=6 offsets of PRBs, and 3*3=9 offsets of PRBs.

3. Possible combinations of predefined frequency domain configurations are indicated by Y bits directly. For example, Y=2 bits indicate four possible combinations of frequency domain configurations, as shown in Table 8. If the value of the frequency domain PDSCH resource configuration is 1, it represents: F_RAR_PRB_start=6, F_RAR_PRB_duration=2, which illustrates that the PDSCH of the random access response is two consecutive PRBs starting from the sixth PRB.

TABLE 8 a 1st exemplary table of the frequency domain configuration (Y = 2)

| configuration index value | the starting PRB | the number of occupied PRBs |
|---|---|---|
| 0 | 3 | 2 |
| 1 | 6 | 2 |
| 2 | 9 | 1 |
| 3 | 12 | 1 |

Embodiment 2

Hereinafter, determining a PDSCH time-frequency resource of a random access contention resolution (PACR) message is taken as an example to illustrate that the present invention provides methods for determining and configuring a time-frequency resource.

When the UE initially accesses the network, it obtains the time-frequency resource position of the PDSCH carrying the system message through the read scheduling information of the downlink control channel, wherein in one case, the DCI indicates the starting position of the frequency domain and the number of frequency domain units occupied by the frequency domain of PDSCH of the system information. According to the default time domain configuration or the time domain configuration selection indicated in the DCI, the UE can accurately obtain the time-frequency resource position of the PDSCH carrying the system message, that is, the UE can determine consecutive OFDM symbols of T_SI_symbol_duration starting from the T_SI_symbol_start OFDM symbol in the time domain with respect to the slot of K0_SI after the time of receiving the DCI. For example, the DCI indicates that the starting position of the frequency domain of PDSCH of the system information starts from the third PRB, namely, F_SI_PRB_start=3, and consecutively occupies six PRBs, namely, F_SI_PRB_duration=6. Meanwhile, if the DCI is received in the Nth slot in the time domain, according to the default time domain configuration, UE can find that the PDSCH carrying the system message scheduled by the DCI is the (N+3)th slot (i.e., K0_SI=3) in the time domain, and the third OFDM symbol is three consecutive OFDM symbols (i.e., T_SI_symbol_duration=3) of the starting OFDM symbol (i.e., T_SI_symbol_start=3).

The UE reads the system information, obtains the random access resource configurations, starts the random access procedure, and after transmitting the random access preamble, the UE searches for possible random access responses therein according to the configured random access response (RAR) window to obtain the correct random access response, and after transmitting a message 3, the UE is ready to receive the DCI of a random access contention resolution message.

In the DCI of the random access contention resolution message, the UE may read the time domain PDSCH resource configuration of the random access contention resolution message, and/or the frequency domain PDSCH resource configuration of the random access contention resolution message.

For the time domain PDSCH resource of the random access contention resolution message configured as X bits, there may be that:

1. A time domain offset configuration in a preset configuration table is indicated by X bits. For example, when X=2, the time domain PDSCH resource configuration represents the index values (0, 1, 2, 3) of the time domain offset configuration table, wherein the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_RACR_symbol_duration=T_SI_symbol_duration; all of the three offsets are included as shown in the example of the following table. For example, when the value of the time domain PDSCH resource configuration is 1, it represents that a time domain offset configuration with a configuration index value of 1 is used, the UE may obtain K0_RACR=K0_SI+0=3,
T_RACR_symbol_start=T_SI_symbol_start+3=6,
T_RACR_symbol_duration=T_SI_symbol_duration+1=4.
That is, the PDSCH corresponding to the random access contention resolution (RACR) message is four consecutive OFDM symbols starting from the sixth OFDM symbol in the slot of (N+3).

Specifically, the offset of the starting OFDM symbol may represent the multiple of T_SI_symbol_duration, as shown in Table 2. At this time, when the value of the time domain PDSCH resource configuration is 1, the calculation for the starting OFDM symbol is changed to: T_RACR_symbol_start=T_SI_symbol_start+1*T_SI_symbol_duration=3+3=6.

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

In particular, for a bit indicating the offset of the starting OFDM symbol, it may:

indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol;

also indicate the multiple of the offset of the starting OFDM symbol based on T_SI_symbol_duration; for example, 2 bits indicate four possible configuration values of [0, 1, 2, 3], and T_SI_symbol_duration=3, which represents 0*3=0 offset of the starting OFDM symbol, 1*3=3 offsets of the starting OFDM symbol, 2*3=6 offsets of the starting OFDM symbol, and 3*3=9 offsets of the starting OFDM symbol.

3. Possible combinations of predefined time domain configurations are indicated by X bits directly. For example, X=2 bits indicate four possible combinations of time domain configurations, as shown in Table 4. If the value of the time domain PDSCH resource configuration is 1, it represents: K0_RACR=1, T_RACR_symbol_start=6, and T_RACR_symbol_duration=2, which illustrates that the PDSCH of RACR is two consecutive OFDM symbols starting from the sixth OFDM symbol on the slot (N+1).

For the frequency domain RAR PDSCH resource configured as Y bits, there may be that:

1. A frequency domain offset configuration in a preset configuration table is indicated by Y bits. For example, when Y=2, the frequency domain PDSCH resource configuration represents the index values (0, 1, 2, 3) of the frequency domain offset configuration table, wherein the frequency domain offset configuration table may include at least one or more of an offset of the starting PRB and an offset of the number of occupied PRBs. When any one of the above two items is not included in the table of the frequency domain offset configuration, it indicates that the value of the item is 0. For example, the frequency domain offset configuration table does not include the offset of the number of occupied PRBs, it indicates that the offset of the number of occupied PRBs is 0, that is, the item does not have an offset, F_RACR_PRB_duration=F_SI_PRB_duration; all of the two offsets are included as shown in the example of Table 1. For example, when the value of the frequency domain PDSCH resource configuration is 1, it represents that a frequency domain offset configuration with a configuration index value of 1 is used, the UE may obtain F_RACR_PRB_start=F_SI_PRB_start+3=6, F_RACR_PRB_duration=F_SI_PRB_duration−3=3. That is, the PDSCH corresponding to the RACR is three consecutive PRBs starting from the sixth PRB.

In particular, the offset of the starting PRB may represent the multiple of F_SI_PRB_duration, as shown in Table 6. At this time, when the value of the frequency domain PDSCH resource configuration is 1, the calculation for the starting PRB is changed to: F_RACR_PRB_start=F_SI_PRB_start+1*F_SI_PRB_duration=3+1*3=6.

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

In particular, for a bit indicating the offset of the starting PRB, it may:

indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_SI_PRB_duration; for example, 2 bits indicate four possible configuration values of [0, 1, 2, 3], and F_SI_PRB_duration=3, which represents that the offset of the starting PRB includes 0*3=0 offset of PRBs, 1*3=3 offsets of PRBs, 2*3=6 offsets of PRBs, and 3*3=9 offsets of PRBs.

3. Possible combinations of predefined frequency domain configurations are indicated by Y bits directly. For example, Y=2 bits indicate four possible combinations of frequency domain configurations, as shown in Table 8. If the value of the frequency domain PDSCH resource configuration is 1, it represents: F_RACR_PRB_start=6, F_RACR_PRB_duration=2, which illustrates that the PDSCH of RACR is two consecutive PRBs starting from the sixth PRB.

Embodiment 3

Hereinafter, another determination of a PDSCH time-frequency resource of a random access contention resolution message is taken as an example to illustrate that the present invention provides methods for determining and configuring a time-frequency resource.

The UE reads the system information, obtains the random access resource configurations, starts the random access procedure, and after transmitting the random access preamble, the UE searches for possible random access response therein according to the configured random access response (RAR) window to obtain the time-frequency resource position of the PDSCH carrying the RAR, that is, the UE can determine consecutive OFDM symbols of T_RAR_symbol_duration starting from the T_RAR_symbol_start OFDM symbol in the time domain with respect to the slot of K0_RAR after the time of receiving the DCI. For example, the DCI indicates that the starting position of the frequency domain of RAR PDSCH starts from the third PRB, namely, F_RAR_PRB_start=3, and consecutively occupies six PRBs, namely, F_RAR_PRB_duration=6. Meanwhile, if the DCI is received in the Nth slot in the time domain, according to the default time domain configuration, UE can find that the PDSCH carrying the RAR scheduled by the DCI is in the (N+3)th slot (i.e., K0_RAR=3) in the time domain, and the third OFDM symbol is three consecutive OFDM symbols (i.e., T_RAR_symbol_duration=3) of the starting OFDM symbol (i.e., T_RAR_symbol_start=3).

The UE obtains the correct random access response, and after transmitting a message 3, the UE is ready to receive the DCI of a random access contention resolution message.

In the DCI of the random access contention resolution message, the UE may read the time domain PDSCH resource configuration of the random access contention resolution message, and/or the frequency domain PDSCH resource configuration of the random access contention resolution message.

For the time domain PDSCH resource of the random access contention resolution message configured as X bits, there may be that:

1. A time domain offset configuration in a preset configuration table is indicated by X bits. For example, when X=2, the time domain PDSCH resource configuration represents the index values (0, 1, 2, 3) of the time domain offset configuration table, wherein, the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_RACR_symbol_duration=T_RAR_symbol_duration; all of the three offsets are included as shown in the example of the following table. For example, when the value of the time domain PDSCH resource configuration is 1, it represents that a time domain offset configuration with a configuration index value of 1 is used, the UE may obtain K0_RACR=K0_RAR+0=3, T_RACR_symbol_start=T_RAR_symbol_start+3=6,T_RACR symbol_duration=T_RAR_symbol_duration+1=4. That is, the PDSCH corresponding to the random access contention resolution (RACR) message is four consecutive OFDM symbols starting from the sixth OFDM symbol in the slot of (N+3).

Specifically, the offset of the starting OFDM symbol may represent the multiple of T_RAR_symbol_duration, as shown in Table 2. At this time, when the value of the time domain PDSCH resource configuration is 1, the calculation for the starting OFDM symbol is changed to: T_RACR_symbol_start=T_RAR_symbol_start+ 1*T_RAR_symbol_duration=3+3=6.

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

In particular, for a bit indicating the offset of the starting OFDM symbol, it may:

indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol;

also indicate the multiple of the offset of the starting OFDM symbol based on T_RAR_symbol_duration; for example, 2 bits indicate four possible configuration values of [0, 1, 2, 3], and T_RAR_symbol_duration=3, representing 0*3=0 offset of the starting OFDM symbol, 1*3=3 offsets of the starting OFDM symbol, 2*3=6 offsets of the starting OFDM symbol, and 3*3=9 offsets of the starting OFDM symbol.

3. Possible combinations of predefined time domain configurations are indicated by X bits directly. For example, X=2 bits indicate four possible combinations of time domain configurations, as shown in Table 4. When the value of the time domain PDSCH resource configuration is 1, it represents: K0_RACR=1, T_RACR_symbol_start=6, and T_RACR_symbol_duration=2, which illustrates that the PDSCH of RACR is two consecutive OFDM symbols starting from the sixth OFDM symbol on the slot (N+1).

For the frequency domain RACR PDSCH resource configured as Y bits, there may be that:

1. A frequency domain offset configuration in a preset configuration table is indicated by Y bits. For example, when Y=2, the frequency domain PDSCH resource configuration represents the index values (0, 1, 2, 3) of the frequency domain offset configuration table, wherein the frequency domain offset configuration table may include at least one or more of an offset of the starting PRB and an offset of the number of occupied PRBs. When any one of the above two items is not included in the table of the frequency domain offset configuration, it indicates that the value of the item is 0, that is, the item does not have an offset. For example, the frequency domain offset configuration table does not include the offset of the number of occupied PRBs, it indicates that the offset of the number of occupied PRBs is 0, that is, there is no offset, F_RACR_PRB_duration=F_RAR_PRB_duration; all of the two offsets are included as shown in the example of Table 1. For example, when the value of the frequency domain PDSCH resource configuration is 1, it represents that a frequency domain offset configuration with a configuration index value of 1 is used, the UE may obtain F_RACR_PRB_start=F_RAR_PRB_start+3=6, F_RACR_PRB_duration=F_RAR_PRB_duration−3=3. That is, the PDSCH corresponding to the RACR is three consecutive PRBs starting from the sixth PRB.

In particular, the offset of the starting PRB may represent the multiple of F_RAR_PRB_duration, as shown in Table 6. At this time, when the value of the frequency domain PDSCH resource configuration is 1, the calculation for the starting PRB is changed to: F_RACR_PRB_start=F_RAR_PRB_start+1*F_RAR_PRB_duration=3+1*3=6.

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

In particular, for a bit indicating the offset of the starting PRB, it may indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_RAR_PRB_duration; for example, 2 bits indicate four possible configuration values of [0, 1, 2, 3], and F_RAR_PRB_duration=3, which represents that the offset of the starting PRB includes 0*3=0 offset of PRBs, 1*3=3 offsets of PRBs, 2*3=6 offsets of PRBs, and 3*3=9 offsets of PRBs.

Possible combinations of predefined frequency domain configurations are indicated by Y bits directly. For example, Y=2 bits indicate four possible combinations of frequency domain configurations, as shown in Table 8. When the value of the frequency domain PDSCH resource configuration is 1, it represents: F_RACR_PRB_start=6, F_RACR_PRB_duration=2, which illustrates that the PDSCH of RACR is two consecutive PRBs starting from the sixth PRB.

Embodiment 4

Hereinafter, determining a PUSCH time-frequency resource of a random access message 3 is taken as an example to illustrate that the present invention provides methods for determining and configuring a time-frequency resource.

The UE reads the system information, obtains the random access resource configurations, starts the random access procedure, and after transmitting the random access preamble, the UE searches for possible random access response therein according to the configured random access response (RAR) window to obtain the time-frequency resource position of the PDSCH carrying the RAR, that is, the UE can determine consecutive OFDM symbols of T_RAR_symbol_duration starting from the T_RAR_symbol_start OFDM symbol in the time domain with respect to the slot of K0_SI after the time of receiving the DCI. For example, the DCI indicates that the starting position of the frequency domain of RAR PDSCH starts from the third PRB, namely, F_RAR_PRB_start=3, and consecutively occupies six PRBs, namely, F_RAR_PRB_duration=6. Meanwhile, if the DCI is received in the Nth slot in the time domain, according to the default time domain configuration, UE can find that the PDSCH carrying the RAR scheduled by the DCI is in the (N+3)th slot (i.e., K0_RAR=3) in the time domain, and the third OFDM symbol is three consecutive OFDM symbols (i.e., T_RAR_symbol_duration=3) of the starting OFDM symbol (i.e., T_RAR_symbol_start=3).

The UE obtains the correct random access response, the UE acquires an UL grant for transmitting the message 3 for the first time in the obtained random access response, or the UE acquires an UL grant for scheduling the retransmission of the message 3 in the DCI, which both indicate the time domain PUSCH resource position of the msg3, and/or the frequency domain PUSCH resource configuration.

For the time domain MSG3 PUSCH resource configured as X bits, there may be that:

1. A time domain offset configuration in a preset configuration table is indicated by X bits. For example, when X=2, the time domain PUSCH resource configuration represents the index values (0, 1, 2, 3) of the time domain offset configuration table, wherein, the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_MSG3_symbol_duration=T_SI_symbol_duration; all of the three offsets are included as shown in the example of the following table. For example, when the value of the time domain PUSCH resource configuration is 1, it represents that a time domain offset configuration with a configuration index value of 1 is used, the UE may obtain K0_MSG3=K0_SI+0=3, T_MSG3_symbol_start=T_SI_symbol_start+3=6, T_MSG3_symbol_duration=T_SI_symbol_duration+1=4. That is, the PUSCH corresponding to the MSG3 is four consecutive OFDM symbols starting from the sixth OFDM symbol in the slot of (N+3).

Specifically, the offset of the starting OFDM symbol may represent the multiple of T_SI_symbol_duration, as shown in Table 2. At this time, when the value of the time domain PUSCH resource configuration is 1, the calculation for the starting OFDM symbol is changed to: T_MSG3_symbol_start=T_SI_symbol_start+1*T_SI_symbol_duration=3+3=6.

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

In particular, for a bit indicating the offset of the starting OFDM symbol, it may indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol.

also indicate the multiple of the offset of the starting OFDM symbol based on T_SI_symbol_duration; for example, 2 bits indicate four possible configuration values of [0, 1, 2, 3], and T_SI_symbol_duration=3, representing 0*3=0 offset of the starting OFDM symbol, 1*3=3 offsets of the starting OFDM symbol, 2*3=6 offsets of the starting OFDM symbol, and 3*3=9 offsets of the starting OFDM symbol.

3. Possible combinations of predefined time domain configurations are indicated by X bits directly. For example, X=2 bits indicate four possible combinations of time domain configurations, as shown in Table 4. When the value of the time domain PDSCH resource configuration is 1, it represents: K0_MSG3=1, T_MSG3_symbol_start=6, and T_MSG3_symbol_duration=2, which illustrates that the PUSCH of MSG3 is two consecutive OFDM symbols starting from the sixth OFDM symbol on the slot (N+1).

For the frequency domain MSG3 PUSCH resource configured as Y bits, there may be that:

1. A frequency domain offset configuration in a preset configuration table is indicated by Y bits. For example, when Y=2, the frequency domain PUSCH resource configuration represents the index values (0, 1, 2, 3) of the frequency domain offset configuration table, wherein the frequency domain offset configuration table may include at least one or more of an offset of the starting PRB and an offset of the number of occupied PRBs. When any one of the above two items is not included in the table of the frequency domain offset configuration, it indicates that the value of the item is 0, that is, the item does not have an offset. For example, the frequency domain offset configuration table does not include the offset of the number of occupied PRBs, it indicates that the offset of the number of occupied PRBs is 0, that is, there is no offset, F_MSG3_PRB_duration=F_SI_PRB_duration; all of the two offsets are included as shown in the example of Table 1. For example, when the value of the frequency domain PUSCH resource configuration is 1, it represents that a frequency domain offset configuration with a configuration index value of 1 is used, the UE may obtain F_MSG3_PRB_start=F_SI_PRB_start+3=6, F_MSG3_PRB_duration=F_SI_PRB_duration−3=3. That is, the PUSCH corresponding to the MSG3 is three consecutive PRBs starting from the sixth PRB.

In particular, the offset of the starting PRB may represent the multiple of F_SI_PRB_duration, as shown in Table 6. At this time, when the value of the frequency domain PUSCH resource configuration is 1, the calculation for the starting PRB is changed to: F_MSG3_PRB_start=F_SI_PRB_start+1*F_SI_PRB_duration=3+1*3=6.

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

In particular, for a bit indicating the offset of the starting PRB, it may indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_SI_PRB_duration; for example, 2 bits indicate four possible configuration values of [0, 1, 2, 3], and F_SI_PRB_duration=3, which represents that the offset of the starting PRB includes 0*3=0 offset of PRBs, 1*3=3 offsets of PRBs, 2*3=6 offsets of PRBs, and 3*3=9 offsets of PRBs.

3. Possible combinations of predefined frequency domain configurations are indicated by Y bits directly. For example, Y=2 bits indicate four possible combinations of frequency domain configurations, as shown in Table 8. If the value of the frequency domain PUSCH resource configuration is 1, it represents: F_MAG3_PRB_start=6, F_MSG3_PRB_duration=2, which illustrates that the PUSCH of MSG3 is two consecutive PRBs starting from the sixth PRB.

Embodiment 5

Hereinafter, determining a PDSCH time-frequency resource of a random access response is taken as an example to illustrate that the present invention provides methods for determining and configuring a time-frequency resource.

The UE reads the system information, obtains the random access resource configurations, starts the random access procedure, and after transmitting the random access preamble, the UE searches for possible random access response therein according to the configured random access response (RAR) window to obtain the time-frequency resource position of the PDSCH carrying the RAR, that is, the UE can determine consecutive OFDM symbols of T_RAR_symbol_duration starting from the T_RAR_symbol_start OFDM symbol in the time domain with respect to the slot of K0_RAR after the time of receiving the DCI. For example, the DCI indicates that the starting position of the frequency domain of RAR PDSCH starts from the third PRB, namely, F_RAR_PRB_start=3, and consecutively occupies six PRBs, namely, F_RAR_PRB_duration=6. Meanwhile, if the DCI is received in the Nth slot in the time domain, according to the default time domain configuration, UE can find that the PDSCH carrying the RAR scheduled by the DCI is in the (N+3)th slot (i.e., K0_RAR=3) in the time domain, and the third OFDM symbol is three consecutive OFDM symbols (i.e., T_RAR_symbol_duration=3) of the starting OFDM symbol (i.e., T_RAR_symbol_start=3).

The UE obtains the correct random access response, the UE acquires an UL grant for transmitting a message 3 for the first time in the obtained random access response, or the UE acquires an UL grant for scheduling the retransmission of the message 3 in the DCI, which both indicate the time domain PUSCH resource position of the msg3, and/or the frequency domain PUSCH resource configuration.

For the time domain MSG3 PUSCH resource configured as X bits, there may be that:

1. A time domain offset configuration in a preset configuration table is indicated by X bits. For example, when X=2, the time domain PUSCH resource configuration represents the index values (0, 1, 2, 3) of the time domain offset configuration table, wherein, the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_MSG3_symbol_duration=T_RAR_symbol_duration; all of the three offsets are included as shown in the example of the following table. For example, when the value of the time domain PUSCH resource configuration is 1, it represents that a time domain offset configuration with a configuration index value of 1 is used, the UE may obtain K0_MSG3=K0_RAR+0=3,
T_MSG3_symbol_start=T_RAR_symbol_start+3=6,
T_MSG3_symbol_duration=T_RAR_symbol_duration+1=4. That is, the PUSCH corresponding to the MSG3 is four consecutive OFDM symbols starting from the sixth OFDM symbol in the slot of (N+3).

Specifically, the offset of the starting OFDM symbol may represent the multiple of T_RAR_symbol_duration, as shown in Table 2. At this time, when the value of the time domain PUSCH resource configuration is 1, the calculation for the starting OFDM symbol is changed to:
T_MSG3_symbol_start=T_RAR_symbol_start+1*T_RAR_symbol_duration=3+3=6.

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

In particular, for a bit indicating the offset of starting OFDM symbol, it may indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol;

also indicate the multiple of the offset of the starting OFDM symbol based on T_RAR_symbol_duration; for example, 2 bits indicate four possible configuration values of [0, 1, 2, 3], and T_RAR_symbol_duration=3, representing 0*3=0 offset of the starting OFDM symbol, 1*3=3 offsets of the starting OFDM symbol, 2*3=6 offsets of the starting OFDM symbol, and 3*3=9 offsets of the starting OFDM symbol.

3. Possible combinations of predefined time domain configurations are indicated by X bits directly. For example, X=2 bits indicate four possible combinations of time domain configurations, as shown in Table 4. When the value of the time domain PUSCH resource configuration is 1, it represents: K0_MSG3=1, T_MSG3_symbol_start=6, and T_MSG3_symbol_duration=2, which illustrates that the PUSCH of MSG3 is two consecutive OFDM symbols starting from the sixth OFDM symbol on the slot (N+1).

For the frequency domain MSG3 PUSCH resource configured as Y bits, there may be that:

1. A frequency domain offset configuration in a preset configuration table is indicated by Y bits. For example, when Y=2, the frequency domain PUSCH resource configuration represents the index values (0, 1, 2, 3) of the frequency domain offset configuration table, wherein the frequency domain offset configuration table may include at least one or more of an offset of the starting PRB and an offset of the number of occupied PRBs. When any one of the above two items is not included in the table of the frequency domain offset configuration, it indicates that the value of the item is 0, that is, the item does not have an offset. For example, the frequency domain offset configuration table does not include the offset of the number of occupied PRBs, it indicates that the offset of the number of occupied PRBs is 0, that is, there is no offset, F_MSG3_PRB_duration=F_RAR_PRB_duration; all of the two offsets are included as shown in the example of Table 1. For example, when the value of the frequency domain PUSCH resource configuration is 1, it represents that a frequency domain offset configuration with a configuration index value of 1 is used, the UE may obtain F_MSG3_PRB_start=F_RAR_PRB_start+3=6,
F_MSG3_PRB_duration=F_RAR_PRB_duration−3=3.
That is, the PUSCH corresponding to the MSG3 is three consecutive PRBs starting from the sixth PRB.

In particular, the offset of the starting PRB may represent the multiple of F_RAR_PRB_duration, as shown in Table 6. At this time, when the value of the frequency domain PUSCH resource configuration is 1, the calculation for the starting PRB is changed to:
F_MSG3_PRB_start=F_RAR_PRB_start+1*F_RAR_PRB_duration=3+1*3=6.

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

In particular, for a bit indicating the offset of the starting PRB, it may indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_RAR_PRB_duration; for example, 2 bits indicate four possible configuration values of [0, 1, 2, 3], and F_RAR_PRB_duration=3, which represents that the offset of the starting PRB includes 0*3=0 offset of PRBs, 1*3=3 offsets of PRBs, 2*3=6 offsets of PRBs, and 3*3=9 offsets of PRBs.

3. Possible combinations of predefined frequency domain configurations are indicated by Y bits directly. For example, Y=2 bits indicate four possible combinations of frequency domain configurations, as shown in Table 8. If the value of the frequency domain PUSCH resource configuration is 1, it represents: F_MAG3_PRB_start=6, F_MSG3_PRB_duration=2, which illustrates that the PUSCH of MSG3 is two consecutive PRBs starting from the sixth PRB.

Embodiment 6

For the random access procedure triggered by the downlink control channel (PDCCH Order), the base station equipment needs to configure dedicated random access resources for the UE, wherein the downlink control channel triggering the random access procedure carries at least one or more of the following information:

The number of downlink transmission beam indexes—X bits—representing several downlink beam indexes for the corresponding random access resources configured in this DCI; wherein, the downlink transmission beam index may be represented by using the following information: synchronous signal block index and/or channel state information-reference signal (CSI-RS) index; the synchronization signal block may include primary synchronization signals, secondary synchronization signals, and broadcast signals including demodulation reference signals. For example, the downlink transmission beam index list information indicates that random access resources corresponding to two SSB indexes are configured in the DCI; if there is no configuration of the number of downlink transmission beam index, the base station configures a random access resource according to the predefined number of downlink transmission beam indexes.

The information configured for each SSB index includes at least one or more of the following:

Downlink transmission beam index—Y1 bits—representing the downlink transmission beam index configured by a specific base station equipment. For example, 6 bits indicate which SSB index in a specific 64 SSBs. Through this information, the UE may determine the downlink beam index bound to the configured random access resource.

Random access preamble index—Y2 bits—representing the specific configured random access preamble sequence index. For example, 6 bits indicate which of the 64 preamble sequences supported in the current cell. Through this information, the UE may determine the preamble sequence to be transmitted;

Random access preamble time-frequency resource index—Y3 bits—representing the random access channel (i.e., time-frequency resource position) information for transmitting the determined random access preamble, and indicating the random access channel mask index of the predefined random access channel (PRACH) mask table that indicates the configuration of a random access channel in a random access channel mask table. At least the time domain position of the random access channel and/or the frequency domain position of the random access channel are included in the random access channel mask table.

The time domain position of the random access channel—Y3_1 bits—as shown in the following table, where the time domain configuration of the random access channel indicates the possible temporal position of the random access channel in a random access configuration period. For example, the random access channel mask index 2 represents random access channels in all even-numbered positions in the time domain, where the even-numbered position may be an even-numbered position in the number ranking of RACH occasions (RO) configured according to the actual situation, or may also be an even-numbered position of the time domain unit in which the RO configured according to the actual situation is, as shown in Table 9.

TABLE 9 a 1st exemplary table of the random access channel mask configuration

| random access channel mask index | time domain configuration of a RO |
| --- | --- |
| 0 | RO 1 |
| 1 | RO 2 |
| 2 | even-numbered RO |
| 3 | odd-numbered RO |

The frequency domain position of the random access channel—Y3_2 bits—indicating the position index of the random access occasions configured by the system in the frequency domain, which may be based on the number of random access occasions that may occur at the same time. For example, if the number of random access occasions that may occur at the same time is 4, Y3_2=2 bits, which indicates which of the four frequency domain positions in which the configured random access occasion is, or the setting of the frequency domain position indicated in the predefined random access channel mask configuration table, as shown in the following table, wherein the frequency domain configuration of the random access channel indicates the possible position of the random access channel in the frequency domain. For example, the random access channel mask index 2 represents random access channels in all even-numbered positions in the frequency domain, where the even-numbered position may be an even-numbered position in the number ranking of the RACH occasion (RO) configured according to the actual situation in the frequency domain, or may also be an even-numbered position of the frequency domain unit in which the RO configured according to the actual situation is, as shown in Table 10.

TABLE 10 a 2nd exemplary table of the random
access channel mask configuration

| random access channel mask index | frequency domain configuration of a random access channel |
| --- | --- |
| 0 | RO 1 |
| 1 | RO 2 |
| 2 | even-numbered RO |
| 3 | Odd-numbered RO |

Figure 4:
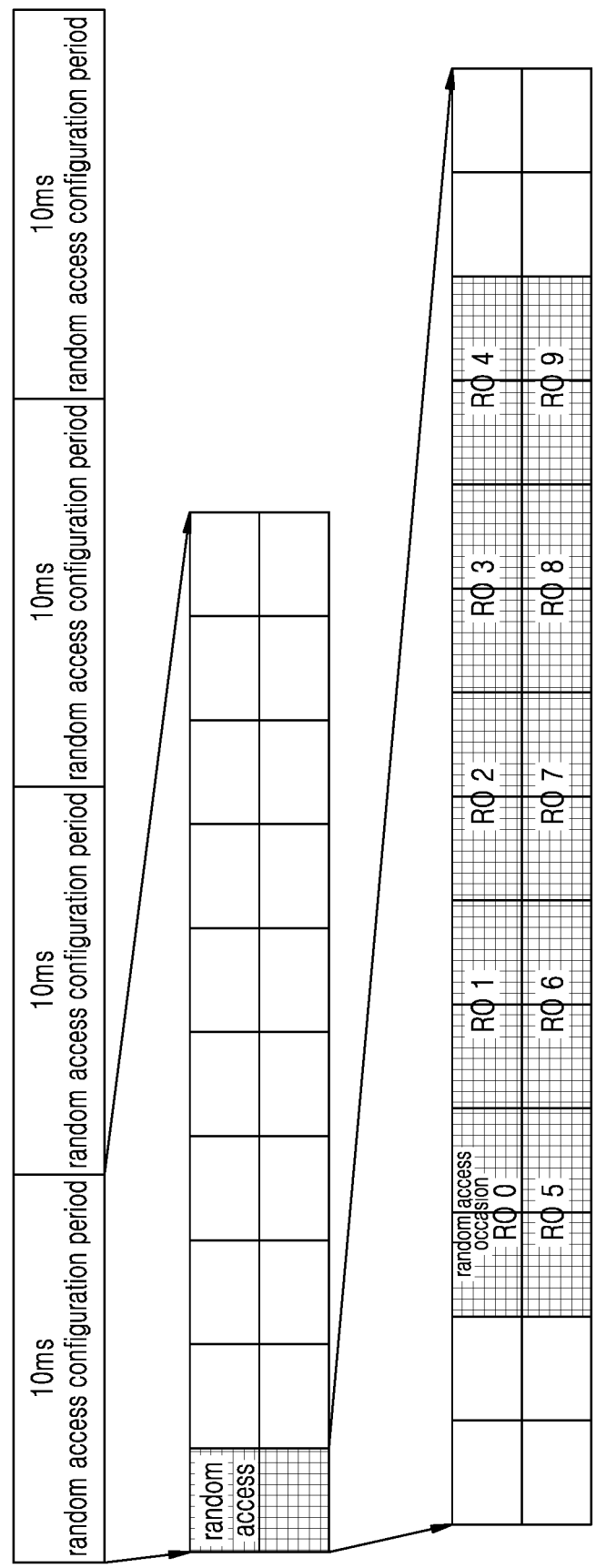
FIG. 4 is a diagram of a preferred example of the time domain of a random access occasion index.

Time-frequency domain position of the random access channel—Y3_3 bits—in addition to the above two ways of separately configuring time and frequency domains but being notified to the UE together, particularly, it may also perform ordering and indexing for all random access occasions that may occur in a random access configuration period, directly instructs random access occasion (RO) indexes to the UE; as shown in FIG. 4, all random access occasions that may occur in a random access configuration period are ordered and numbered, in a manner of the time domain first, from RO 0 to RO 9. Furthermore, they may be ordered and numbered in a manner of frequency domain first. Specifically, when indicating all random access occasions, they may also be indicated by segmented bits, for example, a specific RO index is indicated by a total of Y3_3 bits, where Y3_3_1 bit is used to indicate the first level resource unit index (e.g., the subframe index), and/or Y3_3_2 bit is used to indicate the second level resource unit index (e.g., the random access slot index corresponding to the indicated subframe index), and/or Y3_3_3 bit is used to indicate the third level resource unit index (e.g., the indicated subframe index and the random access occasion index corresponding to the random access slot index), where the resource unit index may be a time domain unit index, and/or a frequency domain unit index; By Y3_3 bit indication, it can directly indicate the RO index or indicate the potential RO configuration via a random access channel mask index using a similar manner to the above predefined random access channel mask configuration as shown in Table 11.

TABLE 11 a 3rd exemplary table of the random
access channel mask configuration

| random access channel mask index | RO configuration |
| --- | --- |
| 0 | RO 1 |
| 1 | RO 2 |
| 2 | even-numbered RO |
| 3 | Odd-numbered RO |
| 4 | all ROs |

Specifically, the aforementioned all random access occasions that may occur in a random access configuration period could also be defined as all random access occasions corresponding to a downlink beam index in a configuration period; wherein the downlink beam index may be:

a downlink beam index carried in the downlink control channel; or a downlink beam index used for transmitting downlink control channel information;

Wherein, the configuration period may be:

a random access configuration period, or;

a time period in which all SSBs in a complete SSB period can be fully mapped to the corresponding RO, for example, an integral number of random access configuration periods.

For example, two SSBs (i.e., SSB_0, SSB_1) in a SSB period are configured in the network side, while in a configuration period, the network is configured with a total of four ROs, and each RO may be mapped to one SSB, that is, both of SSB_0 and SSB_1 are mapped to 2 ROs, that is, the RO index can be selected from {0, 1}; then if the network is configured with SSB_0 and the configured RO index is 1, it is indicated that the UE is configured with the second RO among the ROs corresponding to SSB_0 by the network. At this time, the number of bits used to indicate the time-frequency resource index of the random access preamble in the downlink control information may change with the number of SSBs mapped by each configured RO and the number of ROs in a configuration period. Specifically, the network may preset an RO index value (e.g., an RO index value of 0). When the RO index value is configured, it represents that the UE may perform the transmission of random access preamble by using all ROs corresponding to the downlink beam index in a configuration period, or the UE may randomly select one RO from all ROs corresponding to the downlink beam index in a configuration period with equal probability to perform the transmission of random access preamble.

Specifically, the above random access channel mask index can also be a RO index.

Figure 7:
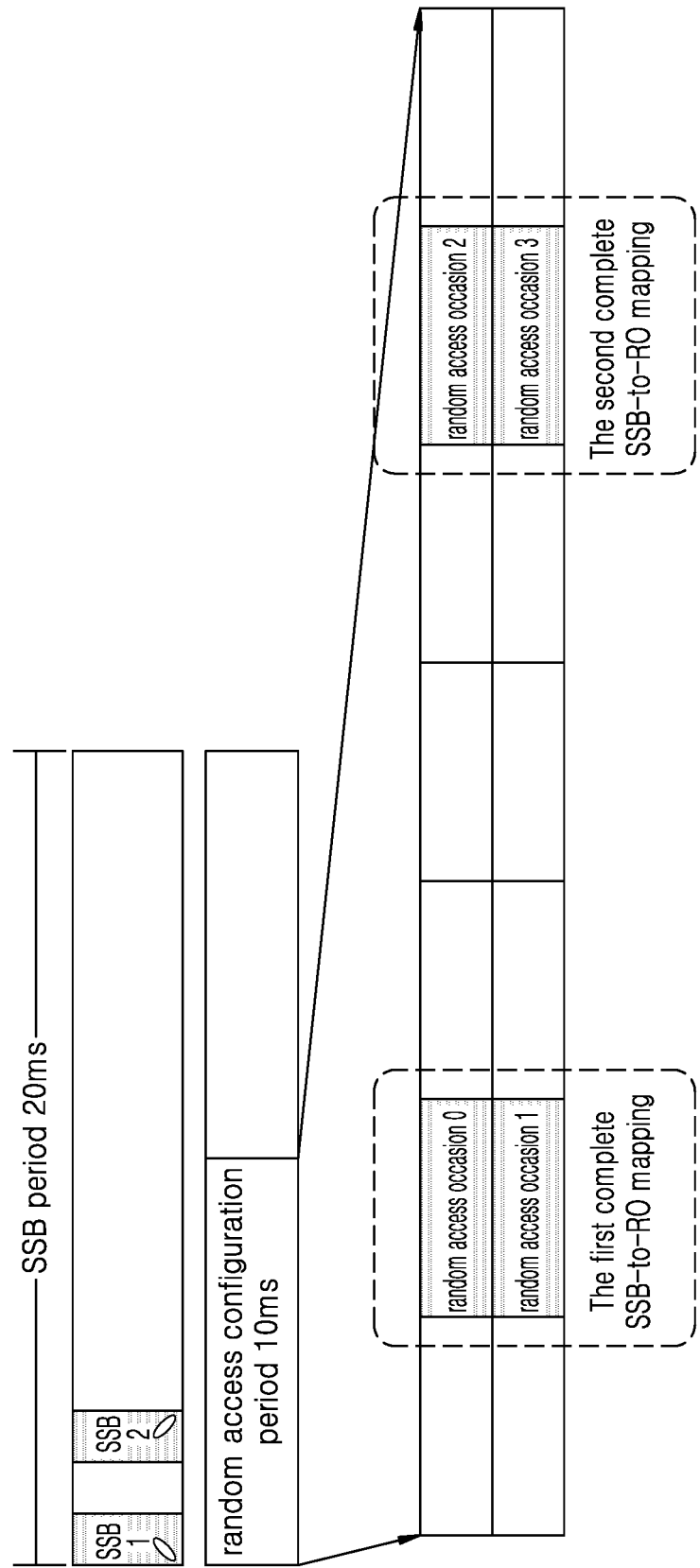
FIG. 7 is a diagram of an example of mapping between SSB and RO.

When a RO index is directly used to indicate a random access occasion corresponding to a downlink beam index, there may be more than one complete SSB-to-RO mapping in one of the above configuration periods, for example, M=2 SSBs are configured in a SSB period. In the mapping rule, one RO may be mapped with N=1 SSB, (the minimum of N is ⅛, which represents that 1 SSB may be mapped to 8 ROs at most in a complete SSB-to-RO mapping in the mapping rule, so Y3_3=3 bits may be used to directly indicate a random access occasion in 1/N corresponding to the downlink beam index), however, there are L=4 ROs in a configuration period, illustrating that there are two complete SSB-to-RO mappings in a configuration period (a random access configuration period in this example) at this time, so it needs to be explicit to the UE that which complete SSB-to-RO mapping where the RO index of SSB is indicated by these 3 bits, wherein the determination manner may include at least one of the following:

a) The RO index carried in the downlink control channel indicates an RO index of the downlink beam index carried in the downlink control channel in the first complete SSB-to-RO mapping in a configuration period. In the above example as shown in FIG. 7, in a configuration period (a random access configuration period in this example), in the first complete SSB-to-RO mapping, SSB1 is mapped to RO 0, and SSB2 is mapped to RO 1; in the second complete SSB-to-RO mapping, SSB1 is mapped to RO 2, and SSB2 is mapped to RO 3. When there are other numbers of SSBs and/or other SSB periods, and/or other random access configuration periods, and/or other configuration periods, and/or other numbers of random access occasions, the SSB-to-RO mapping may be deduced similarly. It may use mapping prioritizing from the time domain, or mapping prioritizing from the frequency domain, or mapping according to a special rule. In this determination manner, the RO index carried in the downlink control channel indicates an RO index of the first complete SSB-to-RO mapping;

b) The RO index carried in the downlink control channel indicates an RO index of the downlink beam index carried in the downlink control channel in the last complete SSB-to-RO mapping in a configuration period. As shown in the example of FIG. 7, in this determination manner, the RO index carried in the downlink control channel indicates an RO index of the last (i.e., the second in this example) complete SSB-to-RO mapping;

c) The RO index carried in the downlink control channel indicates an RO index of the downlink beam index carried in the downlink control channel in any complete SSB-to-RO mapping in a configuration period. As shown in the example of FIG. 7, in this determination manner, the RO index carried in the downlink control channel indicates an RO index of any one (i.e., the first or second in this example) of the complete SSB-to-RO mappings. For example, for the RO index carried in the downlink control channel, the UE may i. randomly selects RO 0 in the first complete SSB-to-RO mapping or RO 2 in the second complete SSB-to-RO mapping with equal probability; or ii. find an RO index in the first available complete SSB-to-RO mapping in accordance with the UE's processing capability and/or the indicated backoff time indication. For example, if the UE has strong processing capability (short processing time) and/or the indicated backoff time is short, the UE may find that the first available complete SSB-to-RO mapping is the first complete SSB-to-RO mapping after receiving the downlink control channel for triggering the random access, that is, the UE uses RO 0 in the first complete SSB-to-RO mapping to transmit the random access preamble; if the UE has weak processing capability (long processing time) and/or the indicated backoff time is long, the UE may find that the first available complete SSB-to-RO mapping is the second complete SSB-to-RO mapping after receiving the downlink control channel for triggering the random access, that is, the UE uses RO 2 in the second complete SSB-to-RO mapping to transmit the random access preamble;

d) The RO index carried in the downlink control channel indicates an RO index of the downlink beam index carried in the downlink control channel in all the complete SSB-to-RO mappings in a configuration period. As shown in the example of FIG. 7, in this determination manner, the RO index carried in the downlink control channel indicates an RO index of all (i.e., the first and second in this example) complete SSB-to-RO mappings; that is, the UE may transmit the preamble both on the RO indexes corresponding to the two complete SSB-to-RO mappings.

Specially, the above four manners for clarifying which complete SSB-to-RO mapping where the RO index of SSB is indicated by these 3 bits are used only when an SSB is configured with more than 1/N (i.e., representing the number of ROs that can be mapped by an SSB at most in a complete SSB-to-RO mapping, for example, 1/N=8) RO in a configuration period, that is, in the case of the existing configuration, the UE may firstly judge the total number N_total_RO of ROs corresponding to an SSB in a configuration period, when:

N_total_RO>1/N, the UE determines the specific RO according to at least one of the above four manners for clarifying which complete SSB-to-RO mapping where the RO index of SSB is indicated by these Y3_3 bits.

N_total_RO<=1/N, the UE directly determines the RO corresponding to the indicated SSB in a configuration period according to the indication of the Y3_3 bits. That is, the Y3_3 bits may indicate the RO index corresponding to the indicated SSB in all of one or more complete SSB-to-RO mappings.

Specifically, the configuration manner provided in this embodiment may also be applied to other configurations of contention-free random access. For example, when a contention-free random access for handover is configured through high-layer signaling, the corresponding high-layer signaling also includes one or more of the following information:

The number of downlink transmission beam indexes;
Downlink transmission beam index;
Random access preamble index;
Random access preamble time-frequency resource index.

Embodiment 7

Hereinafter, another determination of a PDSCH time-frequency resource of a random access contention resolution message is taken as an example to illustrate that the present invention provides methods for determining and configuring a time-frequency resource.

The UE reads the system information, obtains the random access resource configurations, starts the random access procedure, and after transmitting the random access preamble, the UE searches for possible random access responses therein according to the configured random access response (RAR) window to obtain the correct random access response, and transmits a random access message 3, that is, the UE can obtain the time-frequency resource position configuration information of the PUSCH in the transmitted message 3, or when the UE retransmits the message 3, the time-frequency resource configuration information of the PUSCH retransmitted through the message 3 can be obtained by scheduling DCI retransmitted through the message 3. In this embodiment, retransmitting PUSCH through msg3 scheduled by DCI is taken as an example; that is, the UE can determine consecutive OFDM symbols of T_MSG3_symbol_duration starting from the T_MSG3_symbol_start OFDM symbol in the time domain with respect to the slot of K0_MSG3 after the time of receiving the DCI or UL GRANT in RAR. For example, the DCI indicates that the starting position of the frequency domain of MSG.3 PUSCH starts from the third PRB, namely, F_MSG3_PRB_start=3, and consecutively occupies six PRBs, namely, F_MSG3_PRB_duration=6. Meanwhile, if the DCI is received in the Nth slot in the time domain, according to the default time domain configuration, UE can find that the PDSCH carrying the MSG3 scheduled by the DCI is in the (N+3)th slot (i.e., K0_MSG3=3) in the time domain, and the third OFDM symbol is three consecutive OFDM symbols (i.e., T_MSG3_symbol_duration=3) of the starting OFDM symbol (i.e., T_MSG3_symbol_start=3).

After transmitting the message 3, the UE is ready to receive the DCI of a random access contention resolution message.

In the DCI of the random access contention resolution message, the UE may read the time domain PDSCH resource configuration of the random access contention resolution message, and/or the frequency domain PDSCH resource configuration of the random access contention resolution message.

For the time domain PDSCH resource of the random access contention resolution message configured as X bits, there may be that:

1. A time domain offset configuration in a preset configuration table is indicated by X bits. For example, when X=2, the time domain PDSCH resource configuration represents the index values (0, 1, 2, 3) of the time domain offset configuration table, wherein, the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_RACR_symbol_duration=T_MSG3_symbol_duration; all of the three offsets are included as shown in the example of the following table. For example, when the value of the time domain PDSCH resource configuration is 1, it represents that a time domain offset configuration with a configuration index value of 1 is used, the UE may obtain K0_RACR=K0 MSG3+0=3, T_RACR_symbol_start=T_MSG3_symbol_start+3=6, T_RACR_symbol_duration=T_MSG3_symbol_duration+ 1=4. That is, the PDSCH corresponding to the random access contention resolution (RACR) message is four consecutive OFDM symbols starting from the sixth OFDM symbol in the slot of (N+3).

Specifically, the offset of the starting OFDM symbol may represent the multiple of T_MSG3_symbol_duration, as shown in Table 2. At this time, when the value of the time domain PDSCH resource configuration is 1, the calculation for the starting OFDM symbol is changed to: T_RACR_symbol_start=T_MSG3_symbol_start+ 1*T_MSG3_symbol_duration=3+3=6.

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

In particular, for a bit indicating the offset of the starting OFDM symbol, it may indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol;

also indicate the multiple of the offset of the starting OFDM symbol based on T_MSG3_symbol_duration; for example, 2 bits indicate four possible configuration values of [0, 1, 2, 3], and T_MSG3_symbol_duration=3, representing 0*3=0 offset of the starting OFDM symbol, 1*3=3 offsets of the starting OFDM symbol, 2*3=6 offsets of the starting OFDM symbol, and 3*3=9 offsets of the starting OFDM symbol.

3. Possible combinations of predefined time domain configurations are indicated by X bits directly. For example, X=2 bits indicate four possible combinations of time domain configurations, as shown in Table 4. When the value of the time domain PDSCH resource configuration is 1, it represents: K0_RACR=1, T_RACR_symbol_start=6, and T_RACR_symbol_duration=2, which illustrates that the PDSCH of RACR is two consecutive OFDM symbols starting from the sixth OFDM symbol on the slot (N+1).

For the frequency domain RAR PDSCH resource configured as Y bits, there may be that:

1. A frequency domain offset configuration in a preset configuration table is indicated by Y bits, for example, when Y=2, the frequency domain PDSCH resource configuration represents the index values (0, 1, 2, 3) of the frequency domain offset configuration table, wherein the frequency domain offset configuration table may include at least one or more of an offset of the starting PRB and an offset of the number of occupied PRBs. When any one of the above two items is not included in the frequency domain offset configuration table, it indicates that the value of the item is 0, that is, the item does not have an offset. For example, the frequency domain offset configuration table does not include the offset of the number of occupied PRBs, it indicates that the offset of the number of occupied PRBs is 0, that is, there is no offset, F_RACR_PRB_duration=F_MSG3_PRB_duration; all of the two offsets are included as shown in the example of Table 1. For example, when the value of the frequency domain PDSCH resource configuration is 1, it represents that a frequency domain offset configuration with a configuration index value of 1 is used, the UE may obtain F_RACR_PRB_start=F_MSG3_PRB_start+3=6, F_RACR_PRB_duration=F_MSG3_PRB_duration−3=3. That is, the PDSCH corresponding to the RACR is three consecutive PRBs starting from the sixth PRB.

In particular, the offset of the starting PRB may represent the multiple of F_MSG3_PRB_duration, as shown in Table 6. At this time, when the value of the frequency domain PDSCH resource configuration is 1, the calculation for the starting PRB is changed to: F_RACR_PRB_start=F_MSG3_PRB_start+ 1*F_MSG3_PRB_duration=3+1*3=6.

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

In particular, for a bit indicating the offset of the starting PRB, it may indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_MSG3_PRB_duration; for example, 2 bits indicate four possible configuration values of [0, 1, 2, 3], and F_MSG3_PRB_duration=3, which represents that the offset of the starting PRB includes 0*3=0 offset of PRBs, 1*3=3 offsets of PRBs, 2*3=6 offsets of PRBs, and 3*3=9 offsets of PRBs.

Possible combinations of predefined frequency domain configurations are indicated by Y bits directly. For example, Y=2 bits indicate four possible combinations of frequency domain configurations, as shown in Table 8. When the value of the frequency domain PDSCH resource configuration is 1, it represents: F_RACR_PRB_start=6, F_RACR_PRB_ duration=2, which illustrates that the PDSCH of RACR is two consecutive PRBs starting from the sixth PRB.

Hereinafter, determining a PDSCH time-frequency resource of a random access response is taken as an example to illustrate that the present invention provides methods for determining and configuring a time-frequency resource.

Embodiment 8

Hereinafter, determining a PUSCH time-frequency resource of a random access message 3 is taken as an example to illustrate that the present invention provides methods for determining and configuring a time-frequency resource.

The UE reads the system information, obtains the random access resource configurations, starts the random access procedure, and after transmitting the random access preamble, the UE searches for possible random access responses therein according to the configured random access response (RAR) window, obtains the correct random access response to obtain an UL grant initially transmitted through the message 3, and transmits the random access message 3, that is, the UE can obtain the time-frequency resource position configuration information of the PUSCH in the transmitted message 3 in the UL GRANT of RAR, or when the UE retransmits the message 3, the time-frequency resource configuration information of the PUSCH retransmitted through the message 3 can be obtained by scheduling DCI retransmitted through message 3;

In this embodiment, it is introduced that uplink time-frequency resources of a new MSG3 is determined based on the time-frequency resource configuration information transmitted in the previous msg3 and the configuration information in the received DCI for scheduling the transmission of the new MSG3; that is, the UE can determine consecutive OFDM symbols of T_MSG3OLD_symbol_duration starting from the T_MSG3OLD_symbol_start OFDM symbol in the time domain with respect to the slot of K0_MSG3OLD after the time of receiving the DCI or UL GRANT in RAR in the previous transmission of msg3. For example, the starting position of the frequency domain of MSG.3 PUSCH starts from the third PRB, namely, F_MSG3OLD_PRB_start=3, and consecutively occupies six PRBs, namely, F_MSG3OLD_PRB_duration=6. Meanwhile, if the configuration information of the previous MSG3 is received in the Nth slot in the time domain, according to the default time domain configuration, UE can find that the PUSCH of the previous MSG3 is in the (N+3)th slot (i.e., K0_MSG3OLD=3) in the time domain, and the third OFDM symbol is three consecutive OFDM symbols (i.e., T_MSG3OLD_symbol_duration=3) of the starting OFDM symbol (i.e., T_MSG3OLD_symbol_start=3).

The UE may acquire an UL grant for scheduling the transmission of the new message 3 in the DCI, which indicates the time domain PUSCH resource position of msg3, and/or the frequency domain PUSCH resource configuration.

For the time domain MSG3 PUSCH resource configured as X bits, there may be that:

1. A time domain offset configuration in a preset configuration table is indicated by X bits. For example, when X=2, the time domain PUSCH resource configuration represents the index values (0, 1, 2, 3) of the time domain offset configuration table, the time domain offset configuration table may include at least one or more of a slot offset, an offset of the starting OFDM symbol, and an offset of the number of occupied OFDM symbols. When any one of the above three items is not included in the time domain offset configuration table, it indicates that the value of the item is 0, that is, the item does not have an offset. For example, the time domain offset configuration table does not include the offset of the number of occupied OFDM symbols, it indicates that the offset of the number of occupied OFDM symbols is 0, that is, there is no offset, T_MSG3NEW_symbol_duration=T_MSG3OLD_symbol_duration; all of the three offsets are included as shown in the example of the following table. For example, when the value of the time domain PUSCH resource configuration is 1, it represents that a time domain offset configuration with a configuration index value of 1 is used, the UE may obtain K0_MSG3NEW=K0 MSG3OLD+0=3, T_MSG3NEW_symbol_start=T_MSG3OLD_symbol_start+3=6, T_MSG3NEW_symbol_duration=T_MSG3OLD_symbol_duration+1=4. That is, the PUSCH corresponding to the MSG3 is four consecutive OFDM symbols starting from the sixth OFDM symbol in the slot of (N+3).

Specifically, the offset of the starting OFDM symbol may represent the multiple of T_MSG3OLD_symbol_duration, as shown in Table 2. At this time, when the value of the time domain PUSCH resource configuration is 1, the calculation for the starting OFDM symbol is changed to: T_MSG3NEW_symbol_start=T_MSG3OLD_symbol_start+1*T_MSG3OLD_symbol_duration=3+3=6.

2. At least one or more of the slot offset, the offset of the starting OFDM symbol, and the offset of the number of occupied OFDM symbols are indicated by segmented bits in the X bits, respectively. For example, 2 bits of high-order in X=4 bits are used to indicate the slot offset, and 2 bits of low-order are used to indicate the offset of the starting OFDM symbol; wherein, for example, 2 bits of high-order may be used to represent the specific value of the slot offset, that is, 2 bits may represent 0, 1, 2, 3, namely, 0 slot offset, 1 slot offset, 2 slot offsets, and 3 slot offsets; or 2 bits may represent the index of four possible values indicating the slot offset configuration, as shown in the example of Table 3.

In particular, for a bit indicating the offset of the starting OFDM symbol, it may indicate the absolute value of the offset number of the starting OFDM symbol, for example, 2 bits indicate four possible configuration values of [0, 3, 6, 9], which represents 0 offset of the starting OFDM symbol, 3 offsets of the starting OFDM symbol, 6 offsets of the starting OFDM symbol, and 9 offsets of the starting OFDM symbol.

also indicate the multiple of the offset of the starting OFDM symbol based on T_MSG3OLD_symbol_duration; for example, 2 bits indicate four possible configuration values of [0, 1, 2, 3], and T_MSG3OLD_symbol_duration=3, representing 0*3=0 offset of the starting OFDM symbol, 1*3=3 offsets of the starting OFDM symbol, 2*3=6 offsets of the starting OFDM symbol, and 3*3=9 offsets of the starting OFDM symbol.

3. Possible combinations of predefined time domain configurations are indicated by X bits directly. For example, X=2 bits indicate four possible combinations of time domain configurations, as shown in Table 4. When the value of the time domain PUSCH resource configuration is 1, it represents: K0_MSG3NEW=1, T_MSG3NEW_symbol_start=6, and T_MSG3NEW_symbol_duration=2, which illustrates that the PUSCH of MSG3 is two consecutive OFDM symbols starting from the sixth OFDM symbol on the slot (N+1).

For the frequency domain MSG3 PUSCH resource configured as Y bits, there may be that:

1. A frequency domain offset configuration in a preset configuration table is indicated by Y bits. For example, when Y=2, the frequency domain PUSCH resource configuration represents the index values (0, 1, 2, 3) of the frequency domain offset configuration table, wherein the frequency domain offset configuration table may include at least one or more of an offset of the starting PRB and an offset of the number of occupied PRBs. When any one of the above two items is not included in the frequency domain offset configuration table, it indicates that the value of the item is 0, namely, it represents that the item does not have an offset. For example, the frequency domain offset configuration table does not include the offset of the number of occupied PRBs, it indicates that the offset of the number of occupied PRBs is 0, that is, there is no offset, F_MSG3NEW_PRB_duration=F_MSG3OLD_PRB_duration; all of the two offsets are included as shown in the example of Table 1. For example, when the value of the frequency domain PUSCH resource configuration is 1, it represents that a frequency domain offset configuration with a configuration index value of 1 is used, the UE may obtain F_MSG3NEW_PRB_start=F_MSG3OLD_PRB_start+3=6, F_MSG3NEW_PRB_duration=F_MSG3OLD_PRB_duration−3=3. That is, the PUSCH corresponding to the MSG3 is three consecutive PRBs starting from the sixth PRB.

In particular, the offset of the starting PRB may represent the multiple of F_MSG3OLD_PRB_duration, as shown in Table 6. At this time, when the value of the frequency domain PUSCH resource configuration is 1, the calculation for the starting PRB is changed to: F_MSG3NEW_PRB_start=F_MSG3OLD_PRB_start+ 1*F_MSG3OLD_PRB_duration=3+1*3=6.

2. At least one or more of the offset of the starting PRB and the offset of the number of occupied PRBs are indicated by segmented bits in the Y bits, respectively. For example, 2 bits of high-order in X=4 bits are used to indicate the offset of the number of occupied PRBs, and 2 bits of low-order are used to indicate the offset of the starting PRB; wherein, for example, the 2 bits of high-order may be used to represent the specific value of the offset of the number of occupied PRBs, that is, 2 bits may represent 0, 1, 2, 3, namely, 0 offset of the number of PRBs, 1 offset of PRBs, 2 offsets of PRBs, and 3 offsets of PRBs; or 2 bits may represent the index of four possible values indicating the offset configuration of the number of occupied PRBs, as shown in the example of Table 7.

In particular, for a bit indicating the offset of the starting PRB, it may indicate the absolute value of the offset number of the starting PRB, for example, 2 bits indicate four possible configuration values of [0, 3, 6, 9], which represents that the offset of the starting PRB includes 0 offset of PRBs, 3 offsets of PRBs, 6 offsets of PRBs, and 9 offsets of PRBs;

also indicate the multiple of the offset of the starting PRB based on F_MSG3OLD_PRB_duration; for example, 2 bits indicate four possible configuration values of [0, 1, 2, 3], and F_MSG3OLD_PRB_duration=3, which represents that the offset of the starting PRB includes 0*3=0 Offset of PRBs, 1*3=3 offsets of PRBs, 2*3=6 offsets of PRBs, and 3*3=9 offsets of PRBs.

Possible combinations of predefined frequency domain configurations are indicated by Y bits directly. For example, Y=2 bits indicate four possible combinations of frequency domain configurations, as shown in Table 8. If the value of the frequency domain PUSCH resource configuration is 1, it represents: F_MSG3NEW_PRB_start=6, F_MSG3NEW_ PRB_duration=2, which illustrates that the PUSCH of MSG3 is two consecutive PRBs starting from the sixth PRB.

Hereinafter, determining a PDSCH time-frequency resource of a random access response is taken as an example to illustrate that the present invention provides methods for determining and configuring a time-frequency resource.

The present invention further provides a device for determining a time-frequency resource, including the following modules, as shown in FIG. 5:

a resource configuration reception module configured to receive first configuration information sent by a base station;

a time-frequency resource determination module configured to determine the time-frequency resource according to second configuration information defaulted or configured by the base station and offset configuration information in the first configuration information; and a data transmission module configured to perform data transmission on the time-frequency resource.

The present invention further provides a device for determining a time-frequency resource of a random access channel, including the following modules, as shown in FIG. 6:

a random access information configuration module, including: configuring the time-frequency resource of the random access channel and a random access preamble according to downlink control information;

a preamble transmission module, including: transmitting the preamble on the time-frequency resource of the random access channel.

Embodiment 9

The embodiment provides a method for determining system frame numbers (also referred to as a radio frame number) of a target cell and a current serving cell, which is used to determine a mapping relationship between SSB and RO of the target cell, and to find correct positions of SSB and/or RO. The random access is triggered for a handover when the target cell and the serving cell are in any of the following situations:

1. Paired spectrum and a same frequency range;
2. Unpaired spectrum and a same frequency range;
3. Paired spectrum and different frequency ranges;
4. Unpaired spectrum and different frequency ranges.

If the number of SSBs that may be configured in the system is L=4, or L=8, or L=64, the UE may determine, by using a certain condition, that the absolute time difference between the i-th radio frame of the current serving cell and the ith radio frame of the target cell is less than a fixed value or a preset value T; and then the radio frame number of the target cell may be determined, that is, the mapping relationship between SSB and RO of the target cell may be determined, and the correct positions of correct SSB and/or RO may be found; wherein, the certain condition described above may be any one of the following:

1. when the mapping pattern period from SSB to RO in the target cell is greater than T=10 milliseconds;
2. when the mapping pattern period from SSB to RO in the target cell is not equal to T=10 milliseconds;

wherein, the fixed value or the preset value T may be any one of the following (Ts=64*Tc, Tc=1/(480*4096* $10^3$)=1/1966080000 seconds):

a) 153600 Ts;
b) 307200 Ts;
c) 76800 Ts;
d) 5 ms;
e) 10 ms;

f) 2.5 ms.

The association pattern period is composed of a plurality of association periods, and the association period refers to mapping all SSBs in one SSB period to at least N PRACH configuration periods required on corresponding ROs, and the value of N is selected from Table 12. For example, when the PRACH configuration period is 20 ms, N is determined as a minimum value from {1, 2, 4, 8} to make all the SSBs in the SSB period to map to the corresponding ROs. The mapping of SSB-RO between the two mapping pattern periods is completely repeated.

TABLE 12

Examples of Correspondence between PRACH Configuration Period and SSB-RO Mapping Period

| PRACH Configuration Period (ms) | SSB-RO Mapping Period (Number of PRACH Configuration Period) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Embodiment 10

In this embodiment, a method for a UE determining whether it successfully competes in a contention-based random access procedure by using downlink control channel information received is introduced.

When the UE initiates a contention based random access procedure and has sent message 3, for the UE:

In each hybrid automatic repeat request (HARQ) retransmission, it starts or restarts a random access contention resolution timer (ra-ContentionResolutionTimer) on the first OFDM symbol after the end of message 3 transmission;

It monitors a possible downlink control channel (PDCCH) while the random access contention timer is running;

If it receives a notification of the PDCCH transmission from the lower layer:

If the message 3 includes MAC CE (Media Access Control Control Element) of the C-RNTI;

If the random access procedure is triggered by the MAC sublayer itself (such as for uplink scheduling request, etc.) or by the RRC sublayer (such as for handover, etc.), and the detected PDCCH is addressed to the C-RNTI [eg. The Cyclic Redundancy Check (CRC) of the PDCCH is scrambled by the C-RNTI], and an uplink grant for a new transmission is received, and the HARQ process ID/number in the detected PDCCH is a fixed value or a preset value, for example, if the index of the HARQ process in the detected PDCCH is 1, The UE may consider that the contention resolution is successful; stop the random access contention resolution timer; discard the received TEMPORARY C-RNTI; and consider that the random access procedure is successfully completed. In several embodiments provided by the specific implementation, it should be understood that the disclosed systems, devices, and methods may be implemented by other ways. For example, the embodiments of devices described above are merely illustrative. For example, the division of units is only a logical function division and there may be other division manners in practice, for example, multiple units or components may be combined or integrated into another system, or some features may be ignored or not performed. In addition, the illustrated or discussed mutual coupling or direct coupling or communication connection may be indirect coupling or communication connection via some interfaces, devices or units, and may be electrical, mechanical or other forms.

The units described as separate parts may be or may not be physically separated, and the parts shown as units may be or may not be physical units, that is, may be located in one place, or may be distributed on a plurality of network units. Some or all of the units may be selected according to actual needs to achieve the purposes of the solutions of the embodiments.

In addition, each functional unit in each embodiment of the specific implementation may be integrated in one processing unit, or each unit may exist separately and physically, or two or more units may be integrated into one unit. The above integrated unit may be implemented in the form of hardware or software function unit.

Please refer to FIG. 9, the random access process communication method disclosed by the present disclosure comprises the following steps:

Step 101: a preamble is transmitted in an active uplink BWP;

Step 102: a random access response is received, and whether the random access response responds to the uplink BWP in which the preamble is transmitted is decided;

Step 103: whether to transmit corresponding Msg3 is determined according to the result of deciding.

For a new system, the UE can initiate a competitive random access on a BWP with random access resources. The UE has its own active uplink band width part (AU BWP) and active downlink band width part (AD BWP), and two UEs may have different AU BWPs but the same AD BWP, so when a base station equipment (BSE) detects preambles transmitted from different uplink BWPs, it needs to determine in which corresponding downlink BWP the random access response is transmitted. The UE also needs to determine in which corresponding downlink BWP the random access response is received and decides whether the received random access response is correct. The present disclosure provides a signal transceiving method, wherein a UE initiates a competitive random access through an active uplink BWP and determines to receive random access response on either an initial active downlink BWP or a current active downlink BWP by a preset rule. For example, the UE may be specified to return to the initial active downlink BWP to receive the random access response. By scheduling the downlink control information of the random access response or the BWP indication provided in the scheduled random access response, the BSE may indicate that the current random access response is for a random access preamble detected from which uplink BWP. Based on this, the UE can determine whether to transmit the random access message 3.

Please refer to FIG. 10, in a communication system, M uplink BWPs and N downlink BWPs are configured. When M=4, N=4, and UL BWP #3 is the initial active uplink BWP (IAU BWP) as the UE accesses the system, DL BWP #3 is the initial active downlink BWP (IAD BWP) as the UE accesses the system, after the UE accesses the system, the base station configures M=4 uplink BWPs for the UE by the downlink channel and configures an AU BWP for the UE, wherein the AU BWP may be an IAU BWP or other UL BWP, the base station configures N=4 downlink BWPs for the UE by downlink channel and configures an AD BWP for the UE, wherein the AD BWP may be an IAD BWP or other DL BWP.

When the UE performs random access, there are following stations:

1. Whether the UE is unfinished to access network, such as in the initial access state, or has accessed to the network, when the UE selects to transmit the random access preamble on the random access resource of the IAU BWP or current AU BWP, the UE needs to receive a possible random access response on the IAD BWP; that is, the UE needs to search for a possible downlink control channel that schedules the random access response according to the control resource set configured on the IAD BWP; wherein, the UE may need to switch from the current AD BWP to the IAD BWP to receive the possible random access response;

2. When the UE has accessed the network, the UE selects to transmit a random access preamble on the random access channel resources on the current AU BWP, and the UE receives a possible random access response on the current AD BWP;

3. When the UE has accessed the network, the UE selects to transmit a random access preamble on the random access channel resources on the current AU BWP, and the UE randomly selects to receive possible random access response on the current AD BWP or the IAD BWP (when the current AD BWP is not an IAD BWP).

When the BSE prepares to feed back a random access response message to the detected random access preamble, 1. the BSE feeds back the random access response message to the detected random access preamble on all downlink BW;

2. the BSE feeds back the random access response message to the detected random access preamble only on the IAD BWP;

3. particularly, for a contention-free random access process, the BSE feeds back a random access response message to the detected random access preamble on the DL BWP corresponding to the UL BWP where the random access preamble is detected;

4. particularly, on the unpaired spectrum, that is in the time-division system, the BSE feeds back a random access response message to the detected random access preamble on the DL BWP corresponding to the UL BWP where the random access preamble is detected.

In a communication system, multiple UEs may perform a random access process at the same time. The UE that has accessed the system may initiate random access on the random access resources (if any) on the current AU BWP. It is possible that two UEs may select the same random access preamble at the same time from different BWPs. Then the two UEs may use the same Random Access Radio Network Temporary Identifier (RA-RNTI) to search for possible random access response messages. In the base station side, the two same random access preambles are from different BWPs and both may be detected. However, two UEs cannot be distinguished from RA-RNTI and random access responses therein, which results in a collision occurred during two UEs transmit random access message 3. In order to avoid this problem, the disclosure provides the following methods.

Method 1: Different uplink BWP indexes correspond to different RA-RNTI frequency domain indexes. For example, the value of the frequency domain index $f\_id$ in the RA-RNTI is calculated within a carrier range, that is, it includes all BWPs; an index that starts counting from the first random access channel in the IAU BWP is selected, and then the counting sequentially in order of the BWP indexes is proceeded, as shown in FIG. 11, when the IAU BWP is UL BWP #3, the $f\_id$ value is calculated from the PRACH on the IAU BWP, that is, the $f\_id$ on the IAU BWP is 0,1; and the $f\_id$ is continued to be calculated in order of the BWP indexes, for example, in the descending order of the BWP indexes, then it is proceeded to be UL BWP #2, there is no PRACH, and then it is proceeded to the PRACH on UL BWP #1, the $f\_id$ is calculated sequentially as 2,3; when there is no index smaller than BWP #1, it cycles back to the maximum BWP index number and continues to calculate the value of $f\_id$. For example, in the example in FIG. 10, when proceeding to the PRACH on UL BWP #4, the $f\_id$ is calculated sequentially as 4, 5; until all PRACH resources on BWP have been calculated. Wherein it can also be in ascending order of BWP indexes, then after calculating the maximum BWP index, it cycles back to the smallest BWP index number to continue to calculate the value of $f\_id$, that is, the order of calculating of $f\_id$ is UL BWP #3, UL BWP #4, UL BWP #1, UL BWP #2.

Method 2: The value of the frequency domain index $f\_id$ in the RA-RNTI is calculated within a BWP range, that is, if it is still configured as in FIG. 10, then values of the $f\_id$ in UL BWP #1, UL BWP #3, and UL BWP #4 are all 0, 1.

Method 3: The base station adds a BWP indication to the downlink control information (DCI) for scheduling a random access response. The BWP indication indicates the BWP index where the random access channel resource corresponding to the RA-RNTI used by the DCI is located; for example, if 2-bit BWP indicator is added to the DCI for scheduling the RAR, then the examples of the BWP indicator and the corresponding BWP index value are shown in Table 13. When the BWP indicator of the DCI for the scheduling RAR is 01, it means that the RAR scheduled in the DCI corresponds to the detected random access preamble from the UL BWP index 1.

Even if the UE has the same RA-RNTI value, the UE finds that the BWP indicator in the DCI does not match the BWP index where the random access preamble is transmitted by itself, for example, if the UE finds that the BWP indicator in the DCI is BWP index 1, but the BWP index where the random access preamble is transmitted by itself is 3, the UE may know that the RAR scheduled by the DCI is not a RAR that matches itself, and the UE may continue to search for possible random access response in the configured random access response search window, if the random access response search window is not ended yet.

If the UE has the same RA-RNTI value, and the UE finds that the BWP indicator in the DCI is the same as the BWP index where the random access preamble is transmitted by itself, the UE can continue to demodulate the corresponding RAR according to the scheduling of DCI, and detect whether the random access preamble index (RAPID) is correct. When the preamble index in the random access response matches the transmitted preamble, the UE transmits message 3.

TABLE 13

Example table of BWP indictor and the corresponding BWP index value

| BWP indictor | BWP index |
|---|---|
| 00 | 0 |
| 01 | 1 |
| 10 | 2 |
| 11 | 3 |

Method 4: The base station adds a BWP indication to the uplink grant of the scheduled random access response. The BWP indication indicates the BWP index where the random access channel resource corresponding to the RA-RNTI used by the DCI for scheduling the random access response is located, and/or the BWP index where the uplink resource of the scheduled random access message 3 in the random access response is located; for example, a 2-bit BWP indicator is added to the uplink grant of the scheduled RAR, and the examples of the BWP indicator and the corresponding BWP index value are shown in Table 13. When the BWP indicator in the uplink grant of the scheduled RAR is 01, the uplink grant indicating the scheduled RAR corresponds to the detected random access preamble from the UL BWP index 1.

When it is a case that even if the UE has the same RA-RNTI value, but the UE finds that the BWP indicator in the uplink grant of scheduled RAR does not match the BWP index in which the random access preamble is transmitted by itself, for example, the UE finds the BWP indicator in the scheduled RAR's uplink grant is BWP index 1 and the BWP index in which the random access preamble is transmitted by itself is 3, the UE can know that the scheduled RAR is not a RAR that matches itself, and the UE does not transmit the random access message 3 according to the uplink grant configured by RAR; the UE may continue to search for a possible random access response in the configured random access response search window if the random access response search window is not ended yet.

When it is a case that the UE has the same RA-RNTI value, and the UE finds that the BWP indicator in the uplink grant of the scheduled RAR is the same as the BWP index in which the random access preamble is transmitted by itself, and when the RAPID in the RAR also matches the random access preamble transmitted by the UE, the UE may consider the RAR to be correct, and then prepare to transmit a random access response message 3 according to the uplink grant configured in the RAR.

In the above methods, Method 1, Method 3, and Method 4 can be used independently, and Method 2 needs to be used by combining with Method 3 or Method 4.

Please refer to FIG. 12, the user equipment for random access process communication in the present disclosure includes:

a preamble transmitting module, configured to transmit a preamble in an active uplink Band Width Part (BWP);

a random access response receiving module, configured to receive the random access response and decide whether the random access response corresponds to the uplink BWP in which the preamble is transmitted; and a determining module, configured to determine whether to transmit a corresponding message 3 according to the result of deciding.

The operation processes of the preamble transmitting module, the random access response receiving module and the determining module correspond to the steps 101, 102, 103 of the random access method in the present disclosure, and will not be repeated in here.

With reference to the above detailed description of the present disclosure, it can be seen that, compared with the prior art, the present disclosure has at least the following beneficial technical effects.

First, the contention of the UE random access is resolved by the correspondence between the uplink BWP in which the preamble is transmitted and random access response, and the success rate and the efficiency of the random access are significantly improved.

Second, the UE is provided with a mechanism for transmitting a preamble in a corresponding BWP and receiving a random access response, and the problem that different UEs in a new communication system cannot transmit and receive in different active BWPs to perform a random access process is solved.

Thirdly, by adding the BWP indication in the downlink control information, and the correspondence with the RA-RNTI performs the matching of the uplink BWP in which the preamble is transmitted and random access response in two manners, so that the system has better flexibility and expandability.

FIG. 13 is a block diagram illustrating the structure of a terminal (UE) according to the present invention.

Referring to the FIG. 13, the terminal 1300 may include a processor 1310, a transceiver 1320 and a memory 1330. However, all of the illustrated components are not essential. The terminal 1300 may be implemented by more or less components than those illustrated in FIG. 13. In addition, the processor 1310 and the transceiver 1320 and the memory 1330 may be implemented as a single chip according to another embodiment. The aforementioned components will now be described in detail. The terminal 1300 or at least one component of the terminal 1300 may correspond to a device or at least one component of FIG. 5, 6 or 12.

The processor 1310 may include one or more processors or other processing devices that control the proposed function, process, and/or method. Operation of the terminal 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the terminal 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

FIG. 14 is a block diagram illustrating the structure of a base station according to the present invention.

Referring to the FIG. 14, the base station 1400 may include a processor 1410, a transceiver 1420 and a memory 1430. However, all of the illustrated components are not essential. The base station 1400 may be implemented by more or less components than those illustrated in FIG. 14. In addition, the processor 1410 and the transceiver 1420 and the memory 1430 may be implemented as a single chip according to another embodiment. The aforementioned components will now be described in detail. The base station 1400 or at least one component of the base station 1400 may correspond to a device or at least one component of FIG. 5, 6 or 12.

The processor 1410 may include one or more processors or other processing devices that control the proposed function, process, and/or method. Operation of the base station 1400 may be implemented by the processor 1410.

The processor 1410 may determine the locations of transmission resources and reception resources.

The transceiver 1420 may include a RF transmitter for up-converting and amplifying a transmitted signal, and a RF receiver for down-converting a frequency of a received signal. However, according to another embodiment, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the base station 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

It should be understood by those skilled in the art that the present disclosure involves devices for carrying out one or more of operations as described in the present disclosure. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media that information is stored or transmitted by a device (for example, computer) in readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and operations disclosed in the present disclosure can also be alternated, changed, rearranged, decomposed, combined or deleted.

It can be understood by those of ordinary skill in the art that all or some steps in various methods of the above embodiments can be achieved by instructing to related hardware through programs. The programs can be stored in a computer-readable storage medium, and the computer-readable storage medium may include Read Only Memory (ROM), Random Access Memory (RAM), disk or optical disk, etc.

The methods and devices provided by the specific implementation have been described in detail above. For those of ordinary skill in the art, the specific implementation and application range can be changed according to the ideas of the embodiments of the specific implementation. As described above, the contents of the specification should not be construed as limitations to the specific implementation.

The invention claimed is:

1. A method for determining a random access resource by a terminal in a wireless communication system, the method comprising:

receiving, from a base station, configuration information corresponding to a synchronization signal block (SSB) including a SSB index, a random access preamble index and a random access channel mask index;

determining a random access resource based on the SSB index and the random access channel mask index;

determining a random access channel occasion (RO) associated with a SSB indicated by the SSB index, based on the random access channel mask index;

determining a random access preamble based on the random access preamble index; and transmitting, to the base station, the random access preamble on the random access resource, wherein in case that the random access preamble is transmitted for handover to a target cell, absolute time difference between a radio frame of a serving cell and a radio frame of the target cell is determined based on configuration information corresponding to a SSB of the target cell.

2. The method of claim 1, wherein the absolute time difference is less than 153600 Ts, if a SSB to RO mapping period is not equal to 10 ms.

3. The method of claim 1, wherein the RO corresponds to a SSB.

4. The method of claim 1, wherein a RO index is ordered in a manner of frequency domain first.

5. The method of claim 1, wherein the determining of the RO further comprises:

determining the RO in a first available complete SSB-to-RO mapping from among one or more complete SSB-to-RO mapping corresponding to a RO index.

6. A method determining a random access resource by a base station in a wireless communication system, the method comprising:

transmitting, to a terminal, configuration information corresponding to a synchronization signal block (SSB) including a SSB index, a random access preamble index and a random access channel mask index;

receiving, from the terminal, a random access preamble determined based on the random access preamble index on a random access channel resource determined based on the SSB index and the random access channel mask index; and transmitting, to the terminal, a random access response (RAR) based on the random access preamble, wherein the random access channel mask index indicates a random access channel occasion (RO) indicated by the SSB index, and wherein in case that the random access preamble is transmitted for handover to a target cell, absolute time difference between a radio frame of a serving cell and a radio frame of the target cell is determined based on configuration information corresponding to a SSB of the target cell.

7. The method of claim 6, wherein the RO corresponds to a SSB.

8. The method of claim 7, wherein a RO index is ordered in a manner of frequency domain first.

9. A terminal for determining a random access resource, the terminal comprising:
a transceiver; and
at least one controller coupled with the transceiver and configured to:
receive, from a base station, configuration information corresponding to a synchronization signal block (SSB) including a SSB index, a random access preamble index and a random access channel mask index,
determine a random access resource based on the SSB index and the random access channel mask index,
determine a random access channel occasion (RO), based on the random access channel mask index,
determine a random access preamble associated with a SSB indicated by the SSB index based on the random access preamble index, and
transmit, to the base station, the random access preamble on the random access resource,
wherein in case that the random access preamble is transmitted for handover to a target cell, absolute time difference between a radio frame of a serving cell and a radio frame of the target cell is determined based on configuration information corresponding to a SSB of the target cell.

10. The terminal of claim 9, wherein the at least one controller is further configured to:
determine the RO in a first available complete SSB-to-RO mapping from among one or more complete SSB-to-RO mapping corresponding to a RO index.

11. The terminal of claim 9, wherein a RO index is ordered in a manner of frequency domain first.

12. A base station for determining a random access resource, the base station comprising:
a transceiver; and
at least one controller coupled with the transceiver and configured to:
transmit, to a terminal, configuration information corresponding to a synchronization signal block (SSB) including a SSB index, a random access preamble index and a random access channel mask index,
receive, from the terminal, a random access preamble determined based on the random access preamble index on a random access channel resource determined based on the SSB index and the random access channel mask index, and
transmit, to the terminal, a random access response (RAR) based on the random access preamble,
wherein the random access channel mask index indicates a random access channel occasion (RO) indicated by the SSB index, and
wherein in case that the random access preamble is transmitted for handover to a target cell, absolute time difference between a radio frame of a serving cell and a radio frame of the target cell is determined based on configuration information corresponding to a SSB of the target cell.

13. The base station of claim 12, wherein the RO corresponds to a SSB.

14. The base station of claim 13, wherein a RO index is ordered in a manner of frequency domain first.

15. The terminal of claim 9, wherein the RO corresponds to a SSB.

* * * * *